(12) United States Patent
Momchilov et al.

(10) Patent No.: US 11,609,963 B2
(45) Date of Patent: Mar. 21, 2023

(54) DYNAMICALLY CHANGE USER INTERFACES FOR WEB APPLICATIONS AND ASSOCIATED METHODS

(71) Applicant: CITRIX SYSTEMS, INC., Fort Lauderdale, FL (US)

(72) Inventors: Georgy Momchilov, Parkland, FL (US); Jeroen Mattijs Van Rotterdam, Fort Lauderdale, FL (US); Ian D. Patrick, Lake Worth, FL (US)

( * ) Notice: Subject to any disclaimer, the term of this patent is extended or adjusted under 35 U.S.C. 154(b) by 165 days.

(21) Appl. No.: 16/169,155

(22) Filed: Oct. 24, 2018

(65) Prior Publication Data
US 2020/0134099 A1 Apr. 30, 2020

(51) Int. Cl.
*G06F 16/957* (2019.01)
*G06F 16/958* (2019.01)
(Continued)

(52) U.S. Cl.
CPC ........ *G06F 16/9577* (2019.01); *G06F 3/0486* (2013.01); *G06F 3/04845* (2013.01); *G06F 16/958* (2019.01)

(58) Field of Classification Search
CPC ........ G06F 3/011; G06F 3/0346; G06F 3/012; G06F 3/017; G06F 3/0304; G06F 3/0414;
(Continued)

(56) References Cited

U.S. PATENT DOCUMENTS

| 7,490,290 B2* | 2/2009 | White | G06F 40/154 715/236 |
| 9,003,279 B2* | 4/2015 | Peters | G06F 40/174 715/243 |

(Continued)

FOREIGN PATENT DOCUMENTS

WO WO2018053620 3/2018

OTHER PUBLICATIONS (2009) Personalized Start Pages. In: Internet Cool Tools for Physicians. Springer, Berlin, Heidelberg, https://doi.org/10.1007/978-3-540-76382-6_12 (Year: 2009).*

(Continued)

*Primary Examiner* — Glenton B Burgess
*Assistant Examiner* — Rachel J Hackenberg

(57) ABSTRACT

A computing system includes a server and a client computing device. The server includes a web application, and anchor definition layers associated with the web application. The client computing device is operated by an end user and includes a display, and a native application that includes an embedded browser for accessing the web application in a customization mode. The customization mode permits display of one of the web pages along with anchors that can be customized based on what is permitted by the anchor definition layer corresponding to the displayed web page, and customization of the anchors on the displayed web page by the end user to define an anchor customization layer for the displayed web page. In normal use of the web application, the anchor customization layer is applied to the corresponding web page before the corresponding web page is displayed so as to display a customized web page without re-designing the web page itself.

18 Claims, 28 Drawing Sheets

(51) Int. Cl.
*G06F 3/04845* (2022.01)
*G06F 3/0486* (2013.01)

(58) Field of Classification Search
CPC .... G06F 3/044; G06F 3/0481; G06F 3/04815; G06F 3/0482; G06F 3/04845; G06F 3/0486; G06F 3/0485; G06F 3/0484; G06F 3/04847; G06F 3/04886; G06F 3/4883; G06F 16/9577; G06F 16/958; G06F 16/90335; G06F 16/904; G06F 16/955; G06F 16/972; G06F 16/957; G06F 16/9574; G06F 16/986; G06F 16/954
See application file for complete search history.

(56) References Cited

U.S. PATENT DOCUMENTS

| | | | | |
|---|---|---|---|---|
| 9,003,309 | B1* | 4/2015 | Venkateshamurthy | G06F 40/14 715/760 |
| 9,092,137 | B2* | 7/2015 | Gassner | G06F 9/06 |
| 9,176,744 | B2 | 11/2015 | Lee | |
| 9,538,345 | B2 | 1/2017 | Sah et al. | |
| 10,073,923 | B2* | 9/2018 | Koren | G06F 3/0484 |
| 10,108,336 | B2* | 10/2018 | Bloch | G06F 40/14 |
| 10,117,697 | B2* | 11/2018 | Calvin | A61B 17/8833 |
| 2006/0007466 | A1* | 1/2006 | Ben-Yehuda | G06F 40/154 358/1.13 |
| 2008/0263141 | A1* | 10/2008 | DeMesa | G06F 16/9577 709/203 |
| 2009/0144640 | A1* | 6/2009 | Schneider | G06F 3/01 715/760 |
| 2010/0023493 | A1* | 1/2010 | Douglis | G06F 9/451 707/E17.108 |
| 2010/0313252 | A1* | 12/2010 | Trouw | G06Q 30/0222 726/7 |
| 2011/0066934 | A1* | 3/2011 | Treisman | G06F 40/174 715/222 |
| 2012/0254731 | A1* | 10/2012 | Peters | G06F 40/117 715/236 |
| 2013/0219263 | A1* | 8/2013 | Abrahami | G06F 40/117 715/234 |

OTHER PUBLICATIONS

Diaz, Arellano, End-user Browser-Side Modification of Web Pages, B.Benatallah et al. (Eds.): WISE 2014, Part I LNCS 8786, pp. 293-307, 2014, Springer International Publishing Switzerland (Year: 2014).*

Anonymous "Responsive web design" https://en.wikipedia.org/wiki/Responsive_web_design: pp. 3; retrieved from internet Oct. 23, 2018.

* cited by examiner

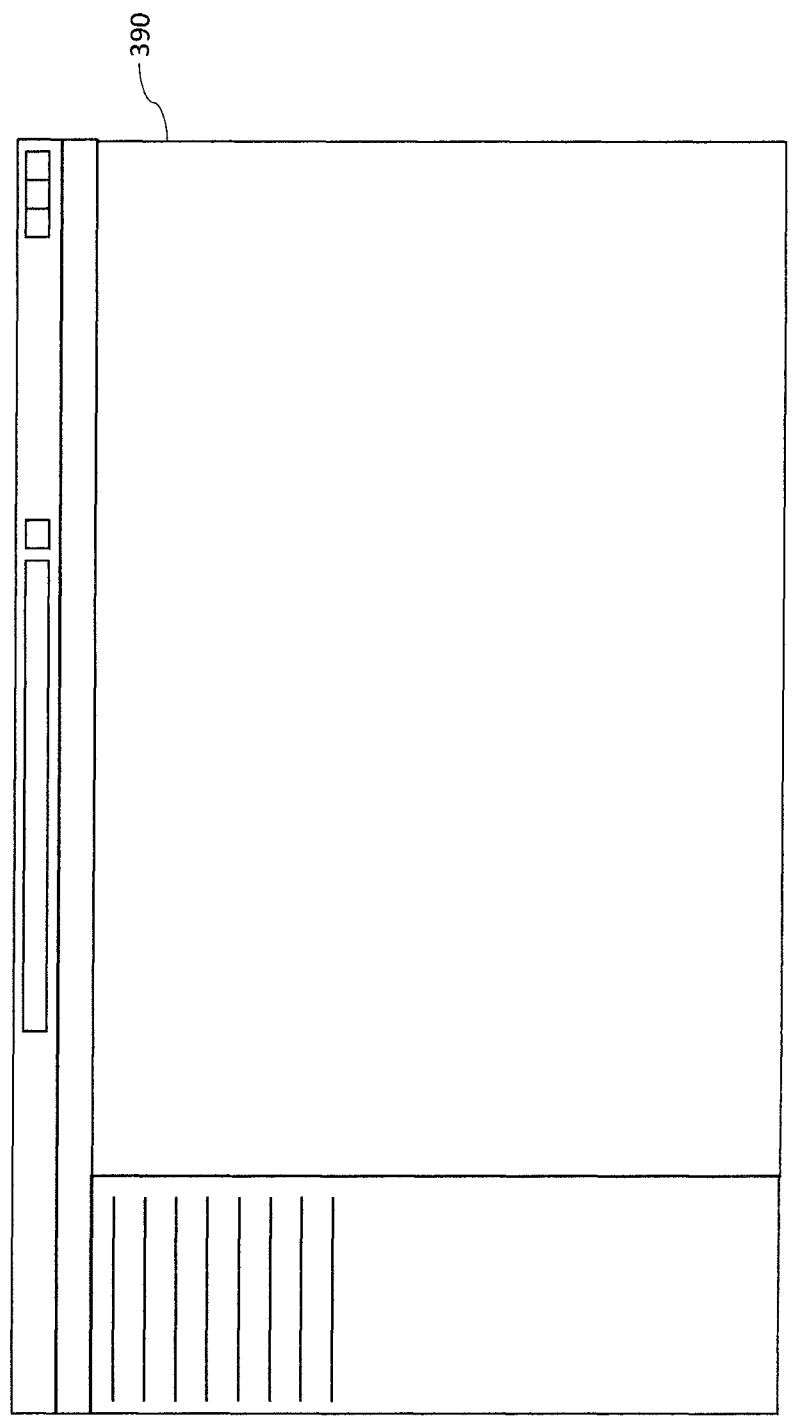

DYNAMICALLY CHANGE USER INTERFACES FOR WEB APPLICATIONS AND ASSOCIATED METHODS

TECHNICAL FIELD

The present disclosure relates to web applications, and more particularly, to enhancing user experience by allowing a user to dynamically change layout of web pages for a web application.

BACKGROUND

Web applications are designed fairly statically where the user interface component layout is designed by software vendors. Interaction designers typically design the application based on a set of standard personas and a set of standard interaction patterns. However, not all users are the same or have the same workflows for a particular application and often need a way to customize the experience.

This is particularly important for task workers that execute the same task over and over again where a custom layout of the interface could significantly improve productivity. The custom layout may eliminate unnecessary components on the screen or may change the order and appearance of components of an interface. There are several types of customizations, including eliminating components on the screen, changing the order and/or position of components, and changing the look and feel of components.

Responsive web design (RWD) is one approach to presenting content based on device resolution/form factor. The layout of a web page with responsive web design may thus be changed depending on the form factor of the display. The layout is adapted to the viewing environment of the computing device. The browser can size the different elements of a web page in relative units like percentages, rather than absolute units like pixels, for example.

However, most solutions only offer the ability to customize the stylesheet of components (i.e., the look and feel) and/or have hard-coded capabilities to configure the layout of components on the screen. For existing web applications it is very hard to customize the UI used in today's browser technology.

SUMMARY

A computing system includes a server, and a client computing device operated by an end user. The server includes a web application, and anchor definition layers associated with the web application identifying which anchor points as displayed on web pages of the web application can be customized by an end user. Each anchor definition layer corresponds to a particular web page.

The client computing device includes a display, and a native application that includes an embedded browser for accessing the web application in a customization mode. The customization mode permits display of at least one of the web pages along with the anchor points that can be customized based on what is permitted by the anchor definition layer corresponding to the displayed web page, and customization of the anchor points on the displayed web page by the end user to define an anchor customization layer for the displayed web page. Upon exiting the customization mode and in normal use of the web application, the anchor customization layer is applied to the corresponding web page before the corresponding web page is displayed so as to display a customized web page for the end user without re-designing the web page itself.

The computing system further includes a second client computing device operated by a user. The user may be an administrator, for example. The second client computing device may include a display, and a native application that includes an embedded browser for accessing the web application in an edit mode. The edit mode permits elements of a web page to be analyzed to identify anchor points, display of the web page along with identified anchor points, and determine based on the user customization options available for each anchor point on the displayed web page what is permitted to be customized by the end user. All of the anchor points available for customization for the displayed web page define the anchor point definition layer that is associated with the displayed web page.

The computing system may further include an enterprise server, wherein the second client computing device is enrolled with the enterprise server, and wherein the anchor definition layers are stored on the enterprise server as part of published resource metadata for the web application.

The customization options for the user include marking selected anchor points that are to be hidden from the end user, and marking selected anchor points that are to be made available to the end user for customization.

The customization options for each selected anchor point available for customization includes at least one of the following: marking the anchor point as being hideable; marking the anchor point as being resizable; marking the anchor point as a source meaning that the anchor point can be moved by the end user from its current position to another position on the web page; marking the anchor point as a target meaning that the anchor point can accept positioning of a source anchor point which in turn causes the target anchor point to be positioned where the source anchor point was initially positioned; and marking the anchor point as a tile meaning that the anchor point would appear as a live tile for the web application when published in a store view by the end user.

The anchor definition layers may be stored on the server as part of published resource metadata for the web application. The anchor customization layer may be stored on the client computing device.

The customization options for the end user for each anchor point that can be customized include at least one of the following: hiding the anchor point; resizing the anchor point; re-positioning the anchor point; and grouping the anchor point with other anchor points.

The computing system may further include an enterprise server, wherein the client computing device is enrolled with the enterprise server, and wherein the anchor customization layer may be cached on the enterprise server.

The customization mode further permits a customized anchor point to be tagged with a label, with the tag and the customizations being saved as a pattern that can be applied to a different web page for customization by the end user based on the different web page having an anchor point tagged with the same label. The customization of the different web page corresponds to the customizations associated with the tagged anchor point.

Another aspect is directed to a method for operating a computing system as described above. The method includes operating the client computing device by an end user for accessing the web application via the embedded browser in a customization mode. The customization mode permits display of at least one of the web pages along with the anchor points that can be customized based on what is permitted by the anchor definition layer corresponding to the displayed web page, and customization of the anchor points on the displayed web page by the end user to define an anchor customization layer for the displayed web page. Upon exiting the customization mode and in normal use of the web application, the anchor customization layer is applied to the corresponding web page before the corresponding web page is displayed so as to display a customized web page for the end user without re-designing the web page itself.

Yet another aspect is directed to a non-transitory computer readable medium for operating a client computing device comprising a native application comprising an embedded browser, the client computing device is part of a computing system comprising a sever comprising a web application and anchor definition layers associated with the web application identifying which anchor points as displayed on web pages of the web application can be customized by an end user, with each anchor definition layer corresponding to a particular web page. The non-transitory computer readable medium has a plurality of computer executable instructions for causing the client computing device to perform the steps as described above.

BRIEF DESCRIPTION OF THE DRAWINGS

FIGS. 11-28 are screen shots from the end user's client computing device illustrated in FIG. 3 where anchor points are customized to define anchor customization layers.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
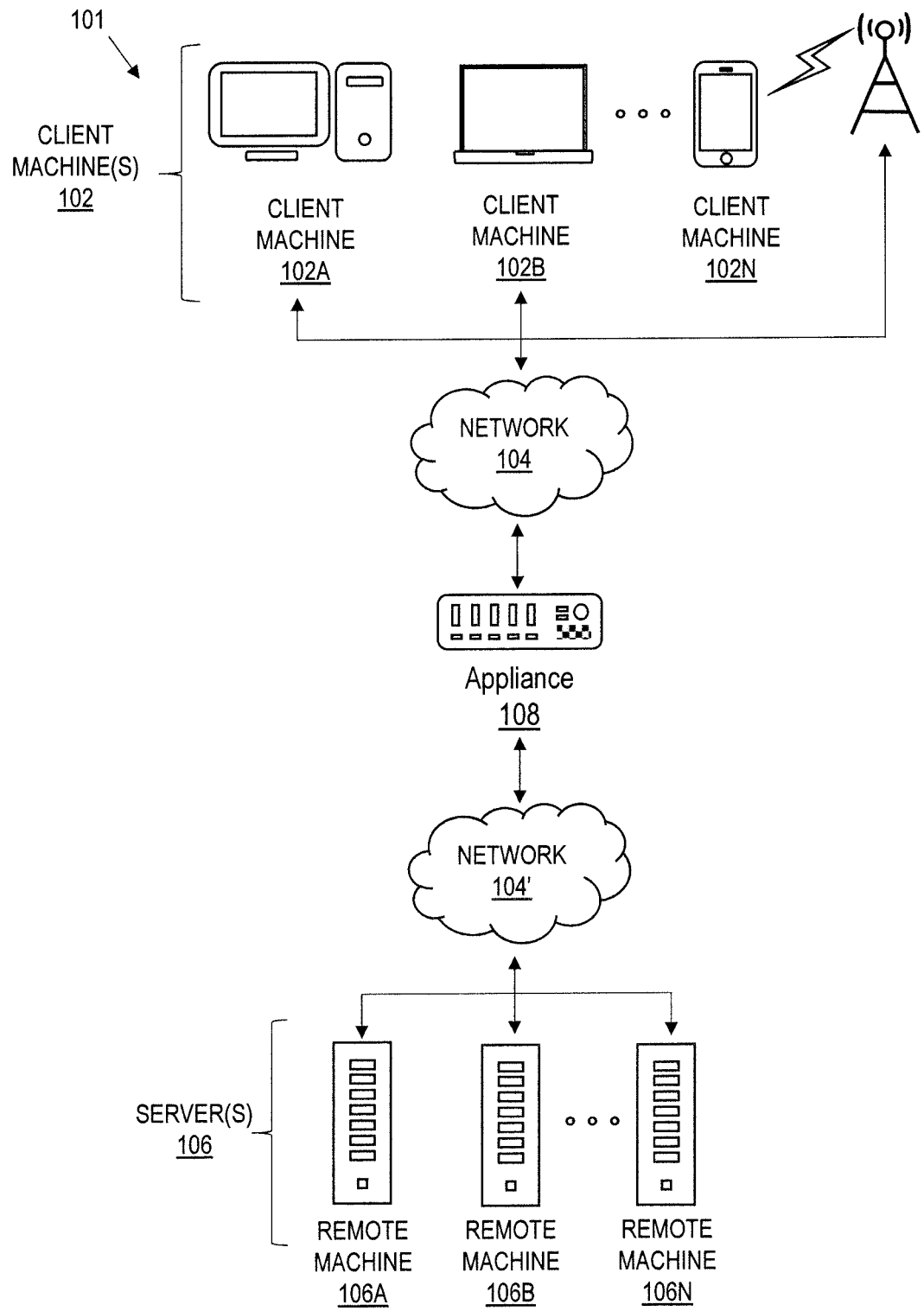
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
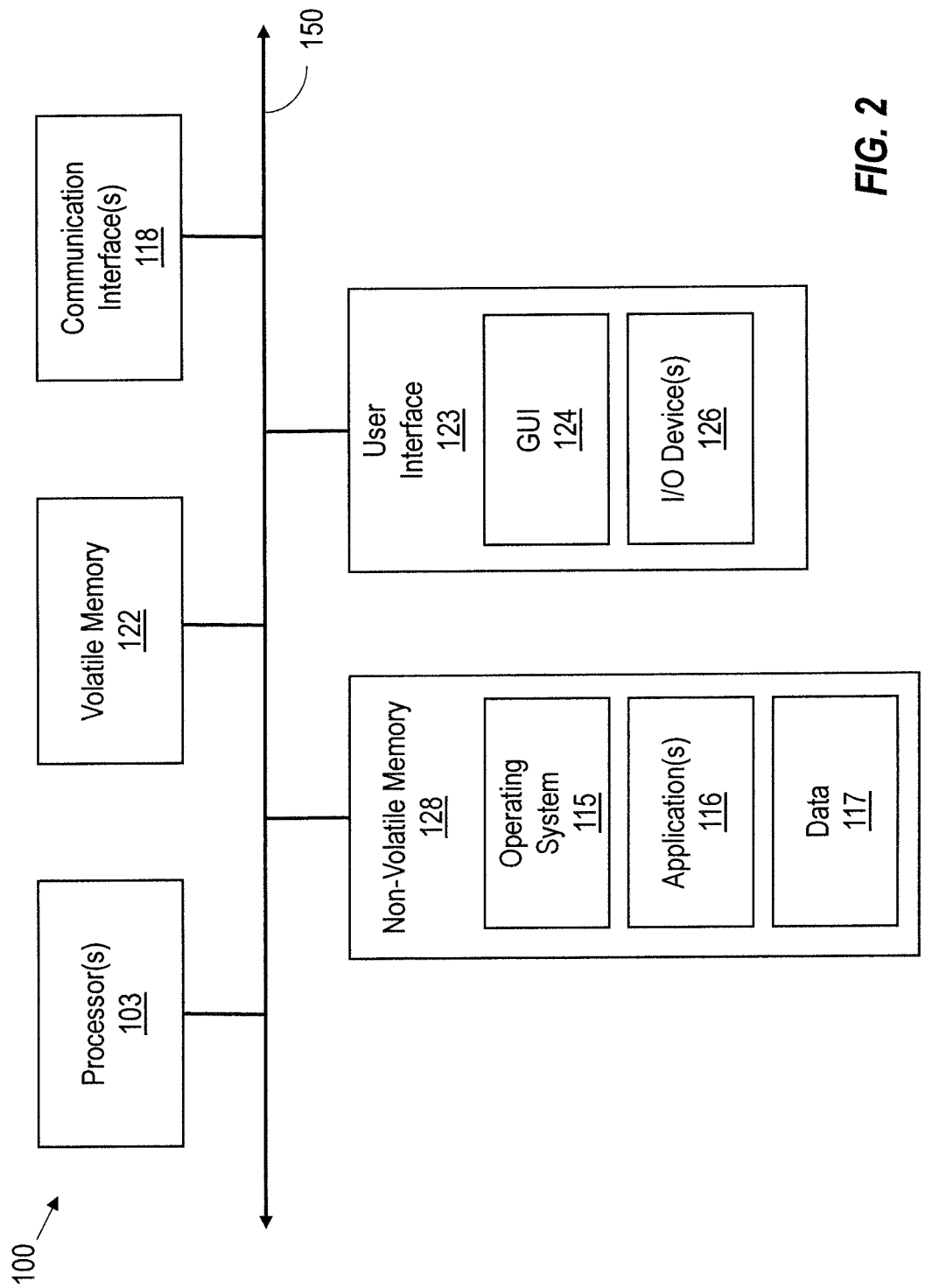
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '1345 patents are both assigned to the current assignee of the present disclosure.

Figure 3:
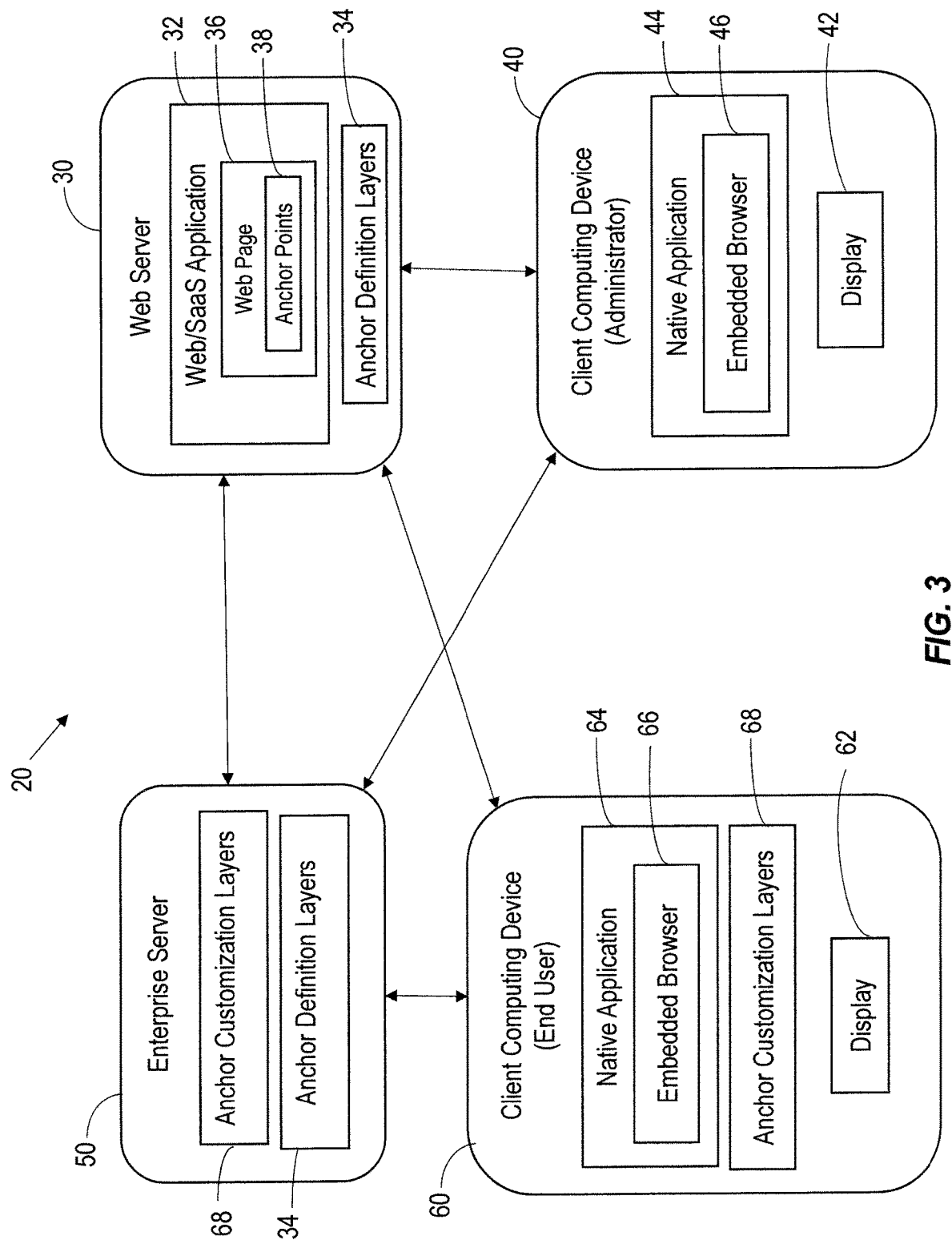
FIG. 3 is a block diagram of a computing system that allows web pages of a web application to be customized by an end user using anchor customization layers in which various aspects of the disclosure may be implemented.

Referring initially to FIG. 3, the illustrated computing system 20 allows an end user to customize the look and feel of the user interfaces (UI) of a web application without re-designing the web application itself. As will be discussed in greater detail below, dynamically changing design of the user interfaces of the web application is based on identifying anchor points within the web application to define anchor definition layers for the web pages, customizing the anchors within the web pages based on what is permitted by the anchor definition layers to define anchor customization layers for the web pages, and applying the anchor customization layers for normal use of the web application so as to display customized web pages for the end user.

In terms of a general description of the illustrated computing system 20, a server 30 includes a web application 32, and anchor definition layers 34 associated with the web application 32 identifying which anchor points 38 as displayed on web pages 36 of the web application 32 can be customized by an end user. Each anchor definition layer 34 corresponds to a particular web page 36.

The anchor definition layers 34 are defined by a user operating a client computing device 40. The user may be an administrator, for example, that is different from the end user customizing the anchor points 38. In some cases, the end user may also define the anchor definition layers 34 instead of the administrator. For discussion purposes, the client computing device 40 will be also referred to as an administrator client computer device.

The administrator client computing device 40 includes a display 42, and a native application 44 that includes an embedded browser 46 for accessing the web application 32 in an edit mode. The edit mode permits the following steps for each web page 36, including analyzing elements of a web page 36 to identify anchor points 38, and displaying the web page 36 along with the identified anchor points 38. The administrator then determines customization options available for each anchor point 38 on the displayed web page 36 that is permitted to be customized by the end user. All of the anchor points 38 available for customization for the displayed web page 36 define the anchor point definition layer 34 that is associated with the displayed web page 36.

Customization options include marking selected anchor points 38 that are to be hidden from the end user, and marking selected anchor points 38 that are available to the end user for customization. For the anchor points 38 that are made available, customization options may include, hiding the anchors 38, resizing the anchors 38, identifying the anchors 38 as sources and/or targets, and identifying an anchor 38 to be used as a live tile in a store view of the web application 32.

An anchor point 38 identified as a source means that the anchor point 38 can be moved by the end user from its current position to another position on the web page 36. An anchor point 38 identified as a target means that the anchor point 38 can accept positioning of a source anchor point 38 which in turn causes the target anchor point 38 to be positioned where the source anchor point 38 was initially positioned. The target anchor point 38 essentially swaps positions with the source anchor point 38.

Yet another customization option includes selecting one of the anchor points 38 to be a tile. A tile would appear as a live tile for the web application 32 when published in a store view by the end user. An anchor point 38 identified as a tile means that this part of the web application 32 would appear as the most recently rendered image in place or in addition to the web application icon.

Each anchor definition layer 34 corresponds to a particular web page 36. Each web page 36 that is customizable by the end user has its own anchor definition layers 34 associated therewith. The anchor definition layers 34 may be stored on the web server 30. The anchor definition layers 34 may be stored as part of the published resource metadata for the web application 32. Alternatively, the anchor definition layers 34 may be stored separate from the web server 30, such as on an enterprise server 50.

For the anchor definition layers 34 stored on the enterprise server 50, the client computing device 40 would then be enrolled with the enterprise server 50. The enterprise server 50 may be part of an enterprise access/security system. The enterprise server 50 may be a unified endpoint management (UEM) server, an enterprise mobility management (EMM) server, or a mobile device management (MDM) server, for example.

A client computing device 60 is operated by the end user. For discussion purposes, the client computing device 60 will be also referred to as an end user client computer device. The end user client computer device 60 includes a display 62, and a native application 64 that includes an embedded browser 66 for accessing the web application 32 in a customization mode. The customization mode permits steps to be performed, including display of at least one of the web pages 36 along with the anchor points 38 that can be customized based on what is permitted by the anchor definition layer 34 corresponding to the displayed web page 36.

The steps further include the end user customizing the anchor points 38 on the displayed web page 36 to define an anchor customization layer 68 for the displayed web page 36. The customization options for the end user for each anchor point 38 that can be customized may include hiding the anchor point, resizing the anchor point, re-positioning the anchor point, and grouping the anchor point with other anchor points. Upon exiting the customization mode and in normal use of the web application 32, the anchor customization layer 68 is applied to the corresponding web page 36 before the corresponding web page 36 is displayed so as to display a customized web page for the end user.

The end user is able to customize the look and feel of the user interfaces (UI) of the web application 32 without re-designing the web application 32 itself. For example, one of the anchor points 38 may be a calendar, and this calendar may be normally positioned on the top left on the web page 36 by the web application 32. However, the end user's preference may be to have the calendar re-positioned on the bottom right on the web page 36. The anchor customization layer 68 advantageously causes the calendar to be re-positioned as determined by the end-user.

Instead of rendering the calendar in its original position based on the web page 36, the embedded browser 66 uses the anchor customization layer 68 to re-position the calendar before rendering the web page 36. The web application 32 remains the same and is not changed or modified. The rendering of the different web pages 36 that are part of the web application 32 go through the anchor customization layers 68 as defined by the end user.

The anchor customization layers 68 may be stored on the end user client computer device 60. The anchor customization layers 68 may also be cached on the enterprise server 50. The end user client computing device 60 would then be enrolled with the enterprise server 50.

As discussed above, an application 44, 64 that contains an embedded browser 46, 66, such as the Citrix Workspace App (WSA), can offer a level of customization that is applied specifically for an end user by merging customization layers 68 onto the original web application 32. The anchor customization layers 68 consist of a definition of order and/or position changes of components (i.e., anchor points 38) as well as definitions of components that are hidden. The web application 32 itself stays unchanged since a respective anchor customization layer 68 is applied by the end user client computer device 60 before the web page 36 is rendered on the end user client computer device 60.

Figure 4:
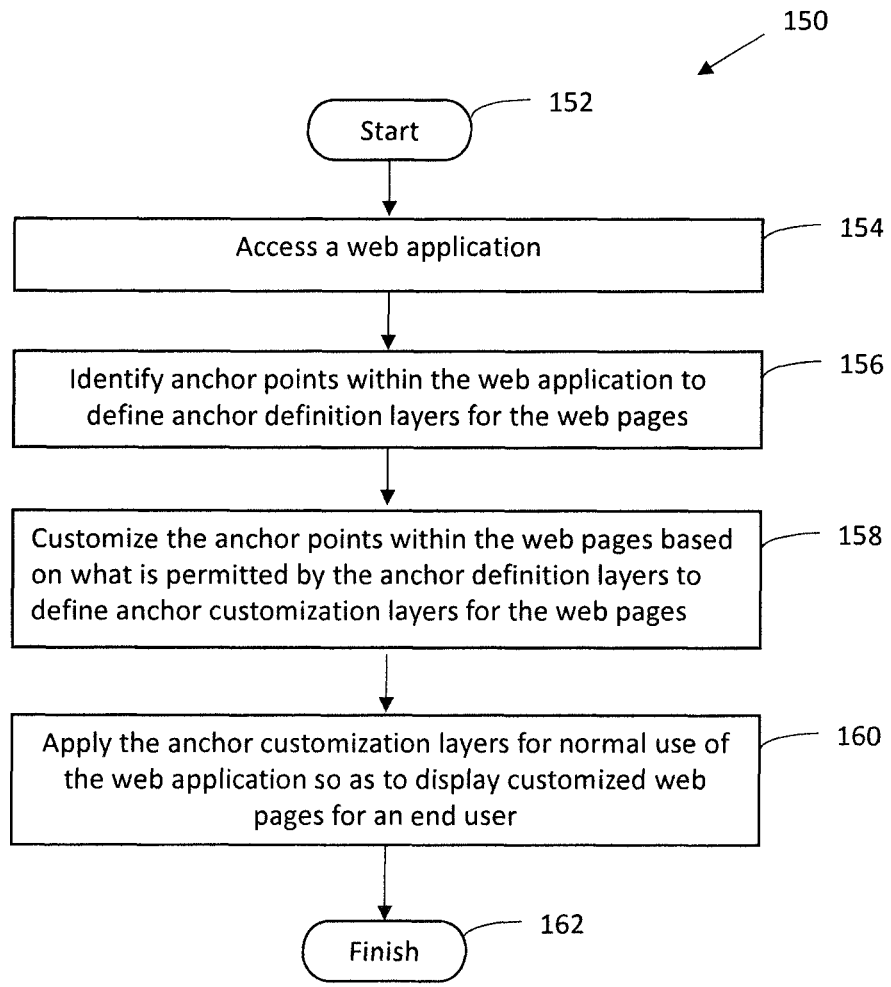
FIG. 4 is a general flowchart illustrating a method for operating the computing system illustrated in FIG. 3.

Referring to the flowchart 150 illustrated in FIG. 4, there are several phases in the UI customization process. From the start (Block 152), the web application 32 is accessed at Block 154. This may be performed by an administrator operating the client computing device 40. A first phase is to identify anchor points 38 within the web application 32 at Block 156 to define anchor definition layers 34 for the web pages 36. This is typically an administrator's task. This results in an anchor definition layer 34 for each web page 36 in the web application 32.

A second phase is to customize the anchor points 38 within the web pages 36 at Block 158 based on what is permitted by the anchor definition layers 34 to define anchor customization layers 68 for the web pages 36. The customization offers a customization edit capability to end users to re-arrange components with the help of the anchor definition layer 34 and/or identify components to be hidden.

A third phase is to apply the anchor customization layers 68 at Block 160 for normal use of the web application 32 so as to display customized web pages for the end user. The process ends at Block 162.

It is possible for the first and second phases above to be performed by an administrator or for both to be performed by the end user. However, to hide most complexity from the end user and to offer the ability to the end user to customize their web application 32 experience, it is preferred that the first phase is to be performed by the administrator while the second phase is to be performed by the end user. The first phase may be performed by an administrator container application or by the Citrix Workspace App, for example, in a special administrator mode. The second and third phases may be performed by the Citrix Workspace App as well.

In the anchor point identification phase, administrators are offered an edit mode where the container application running the web application dialog processes the underlying DOM structure to identify UI enclosures: DIV, XPath/XPointer. For example, HTML <div> elements are identified. A<div> element defines a division or a section in an HTML document. It is a block level element that is often used as a container for grouping other HTML elements, e.g., to style then with CSS or to perform certain tasks with JavaScript.

Enclosures are intelligently identified to reduce the number of possible anchor points 38 significantly. For instance, empty <div/> structures are irrelevant as anchor points 38.

The administrator is presented with a dialog with all possible anchor points 38. A dialog corresponds to a web page 36. Each anchor point 38 is identified by a generated XPath expression. This is the source XPath expression identifying a component. The administrator then identifies for each anchor point 38 whether it is made available to the end user for customization and/or whether this is a source anchor, a target anchor, or both, and whether the component is hideable. This results in an anchor definition layer 34 for each dialog. An anchor definition layer 34 may be as follows:

Application X, Dialog Y
Anchor 1: //div[@id="from"]
   Hideable: yes
   Source: yes
   Target: yes
Anchor 2: //div[1]
   Hideable: no
   Source: no
   Target: yes In the customization definition phase, the end user is presented with a customization function available in the container application that contains the embedded browser 66, e.g., Citrix Workspace App, which may contain a Chromium-engine-based embedded browser. When viewing a particular screen 36 of the web application 32 the end users can activate this customization function. The activation may be performed using a menu item, a hot key or some other method.

When activated the anchor points 38 show up and the end user can now customize the dialog by hiding components or by rearranging the components using drag and drop. This results in a customization mapping definition for anchor points 38 based on their source XPath expression, such as the following:

Customization Application X, Dialog Y, User Z
Anchor 1: Hide
Anchor 3: Move to anchor 1

In the customization application phase, the end user uses the web application 32 and the container application retrieves the application customization mapping definition for the specific end user. The application customization mapping changes the incoming HTML page before it is rendered by the embedded browser 66.

Additional UI details include the following:
Enter/exit edit mode.
Highlight the available anchors (injection points).
Modifying relative layout of different anchors on the page: move, resize, hide.
Generate a new anchor. This could be the equivalent of a user moving a source anchor to a new position that has previously been unused. For example, if an app has empty real estate in some areas.

Highlight what user sees as a group of anchors. This is the ability to distinguish between anchors and groups for purposes of describing the UI presented to the user. A group could be a collection of low-level anchors that could collectively be moved to a target anchor and re-arranged, resized or hidden. Edit the groups themselves: set of anchors within each group, add or remove a group. Anchors within a group may have to have similar properties, e.g., hide-able, source, target.

UI for administrator and/or end user to add tags (labels) for anchors. For example, "my tasks", "calendar", "dashboard".

UI for a user to name a "pattern" (customization mapping definition), save pattern, apply pattern, manage/edit pattern. The tags could be used to automatically and repetitively or suggestively apply patterns to new apps with similarly tagged anchors. This could be complemented with identifying categories of apps, e.g., text content rich, dashboard style, etc. For example, move calendar always to top right. Move my tasks on top.

Flows may be broken down into more granular steps. For example, divide a large page into two or more tabs with navigation controls.

Parts of the page that are not important are blocked out. For example, optional fields in a form that user never fills.

Pages with repetitive tasks (prefill) are skipped through.

An anchor point 38 or a group of anchor points 38 is identified to appear as "live tile" in store view previewing a SaaS application. That is similar to Microsoft Live Tiles, for example, a news app showing rotating images and titles of latest news. But it is also different because the user customizes the live preview of the SaaS application.

Referring now to FIGS. 5-8 screen shots from the administrator's client computing device 40 will be discussed. This corresponds to the first phase of the UI customization process, which is to analyze the web pages 36 within the web application 32 to identify anchor points 38 for each web page 36, and then determine which anchor points 38 per web page 36 are available for customization by an end-user, with the determination defining anchor definition layers 34 associated with the web pages 36.

Figure 5:
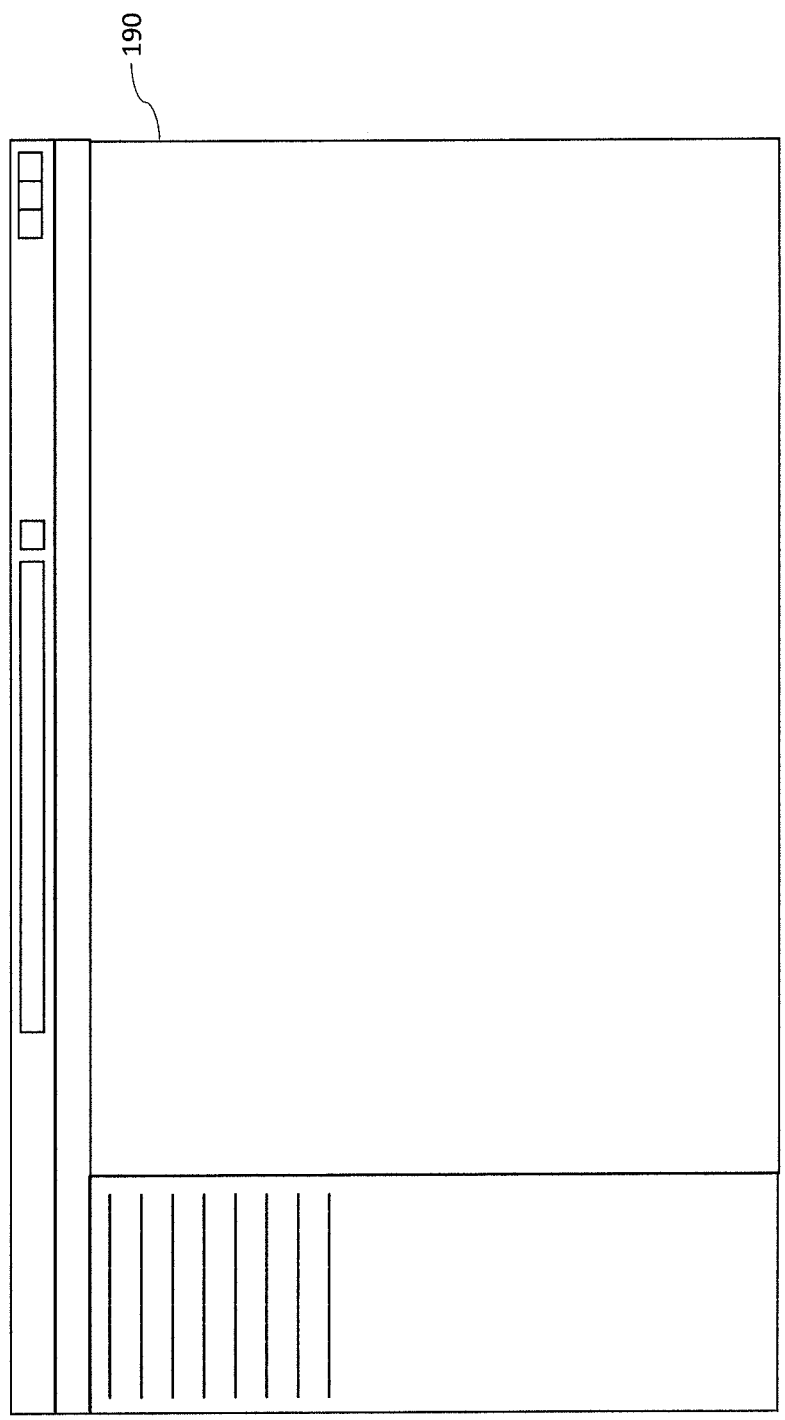
FIGS. 5-10 are screen shots from the administrator's client computing device illustrated in FIG. 3 where anchor points are identified and anchor definition layers for the web application are defined.
Figure 6:
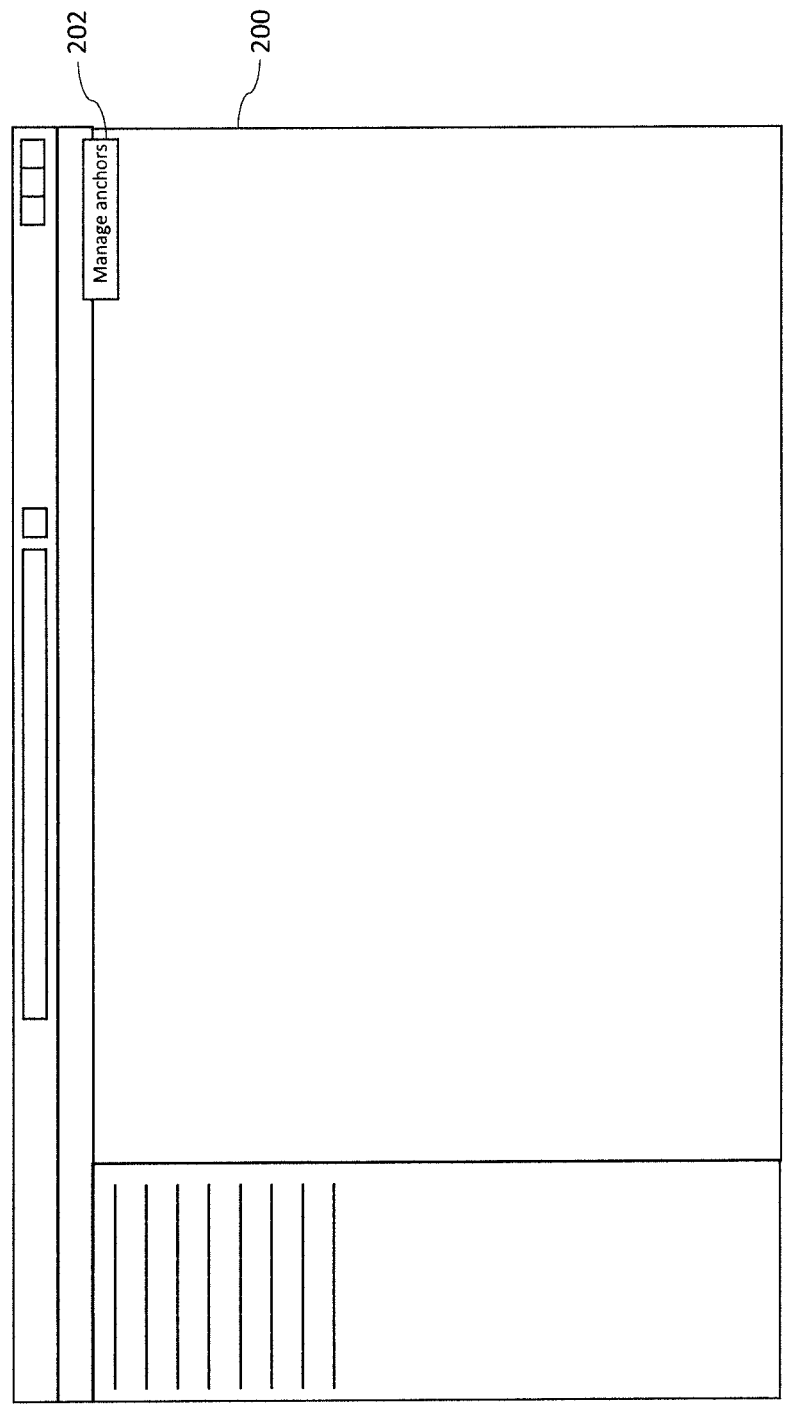

The administrator accesses the web application 32 as illustrated by screen shot 190 in FIG. 5. Screen shot 190 corresponds to a particular web page 36 within the web application 32. Once the web application 32 has been accessed, then the administrator selects manage anchors in a menu item 202 as illustrated by screen shot 200 in FIG. 6.

Figure 7:
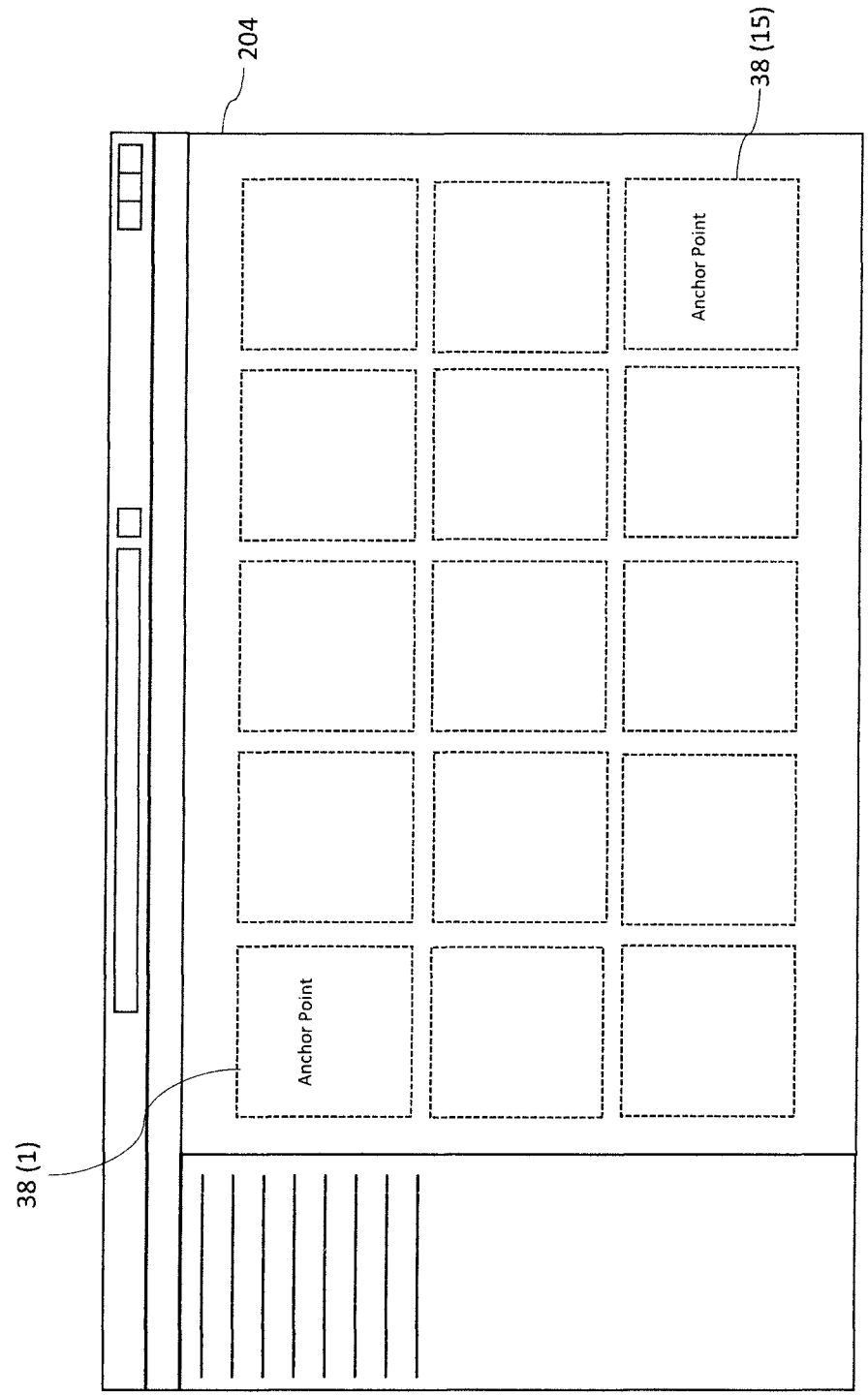
Figure 8:
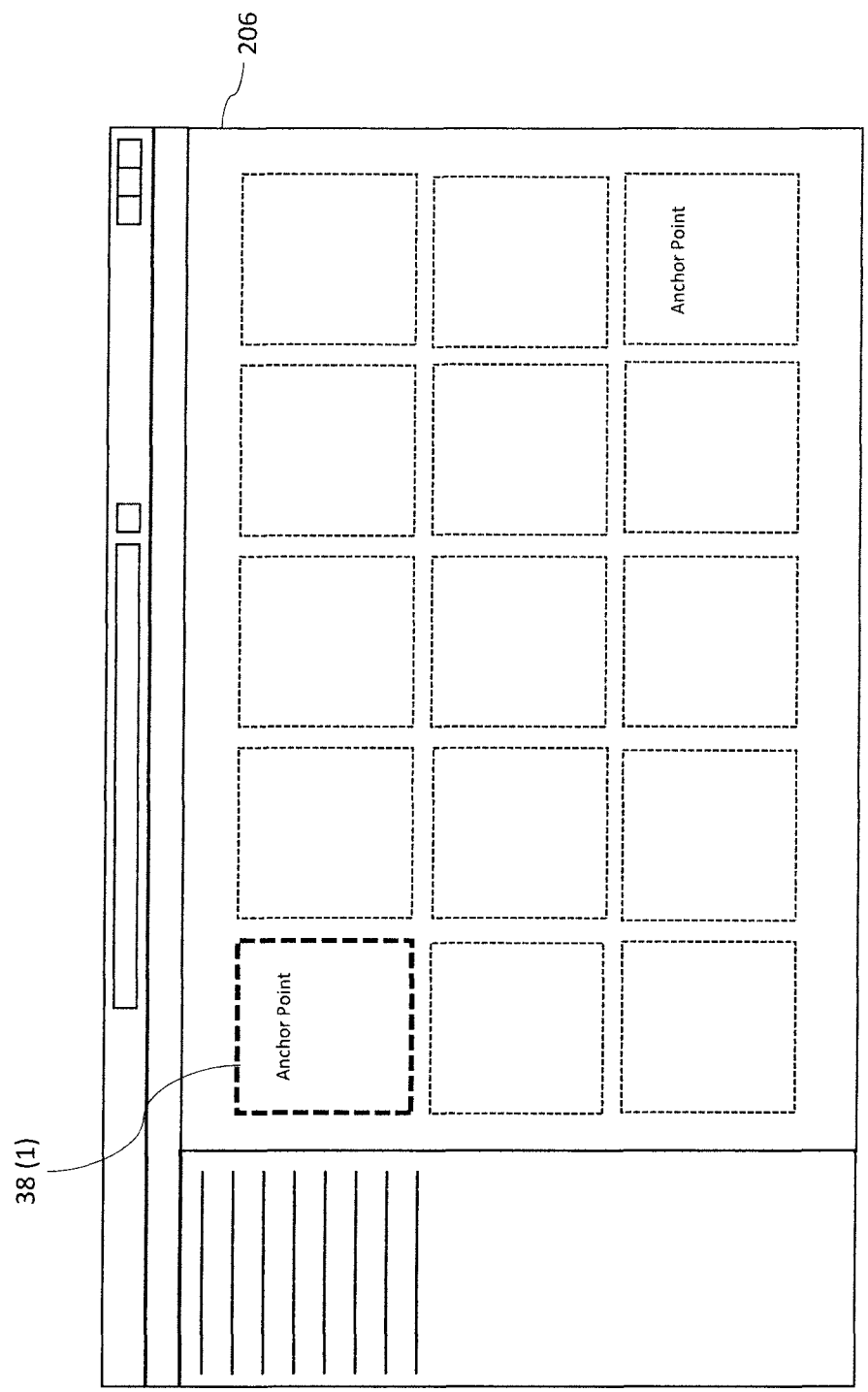
Figure 9:
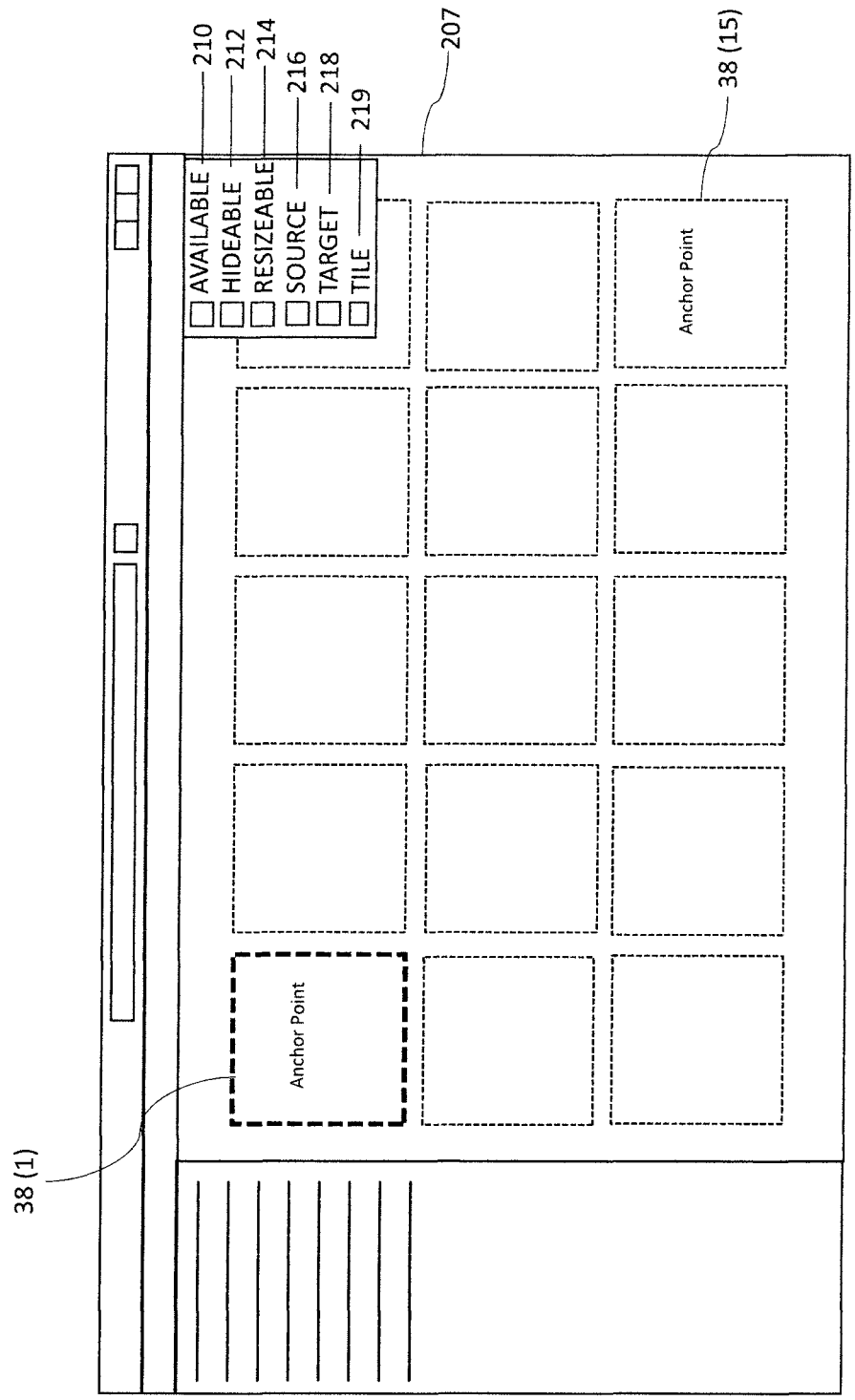

After selection of the manage anchors in menu item 202, the available anchor points 38(1)-38(15) for the web page 36 are shown as illustrated by screen shot 204 in FIG. 7. The administrator then selects one of the anchor points 38(1) as illustrated by screen shot 206 in FIG. 8. The anchor point 38(1) is highlighted when selected. After the anchor point 38(1) has been selected, menu item 208 appears as illustrated by screen shot 207 in FIG. 9.

Menu item 208 provides the customization options available to the administrator for the selected anchor point 38(1). The customization options include marking the selected anchor point 38(1) as available for customization based on the administrator selecting the available menu item 210. If the available menu item 210 is not selected by the administrator, then the selected anchor point 38(1) will appear as is to the end user. In other words, the selected anchor point 38(1) will not be customizable by the end user.

If the selected anchor point 38(1) is marked as being available, the administrator determines if the selected anchor point 38(1) is to be hideable by marking the hideable menu icon 212, is to be resizable by marking the resizable menu icon 214, is to be a source anchor by marking the source menu icon 216, is to be a target anchor by marking the target menu icon 218, or is to be a tile by marking the tile menu icon 219.

The anchor point 38(1) marked as a source means that the anchor point 38(1) can be moved by the end user from its current position to another position on the web page 36. The anchor point 38(1) identified as a target means that the anchor point 38(1) can accept positioning of a source anchor point which in turn causes the target anchor point 38(1) to be positioned where the source anchor point was initially positioned. A tile would appear as a live tile for the web application 32 when published in a store view by the end user.

Figure 10:
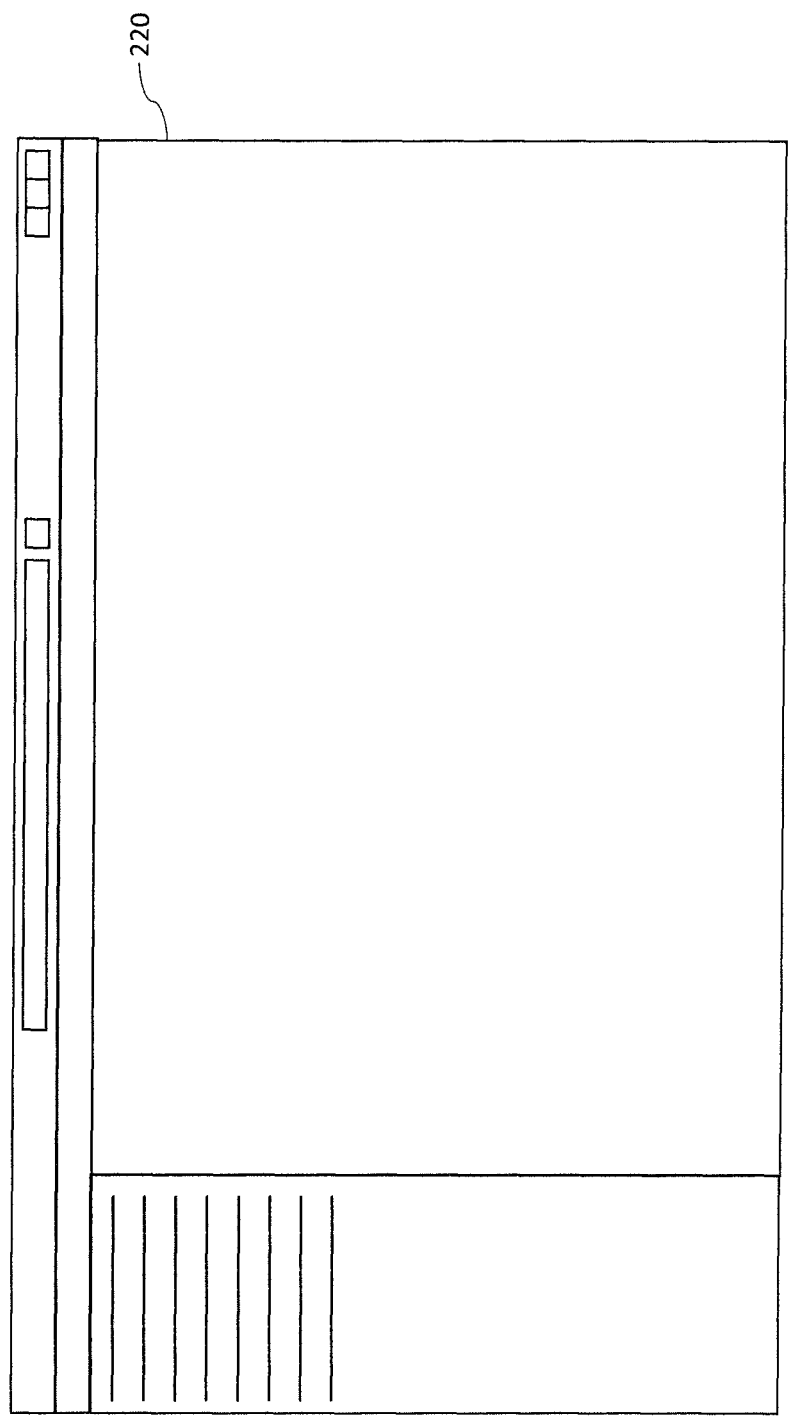

The above selections from the menu item 208 may be repeated by the administrator for any of the remaining anchor points 38(2)-38(15) on the displayed web page 36. Once this is completed, an anchor definition layer 34 is defined for the displayed web page 36. Each anchor definition layer 34 thus corresponds to a particular web page 36. This process is repeated by the administrator for the other web pages 36 within the web application 32. When the administrator is done, a web page 36 of the web application 32 appears, as illustrated by screen shot 220 in FIG. 10.

Referring now to FIGS. 11-28 screen shots from the end user's client computing device 60 will be discussed. This corresponds to the second phase of the UI customization process, which is to customize the anchor points 38 per web page 36 based on what is permitted by the anchor definition layers 34 associated with the respective web pages 36, with the customization defining an anchor customization layer 68 associated with each web page 36.

Figure 11:
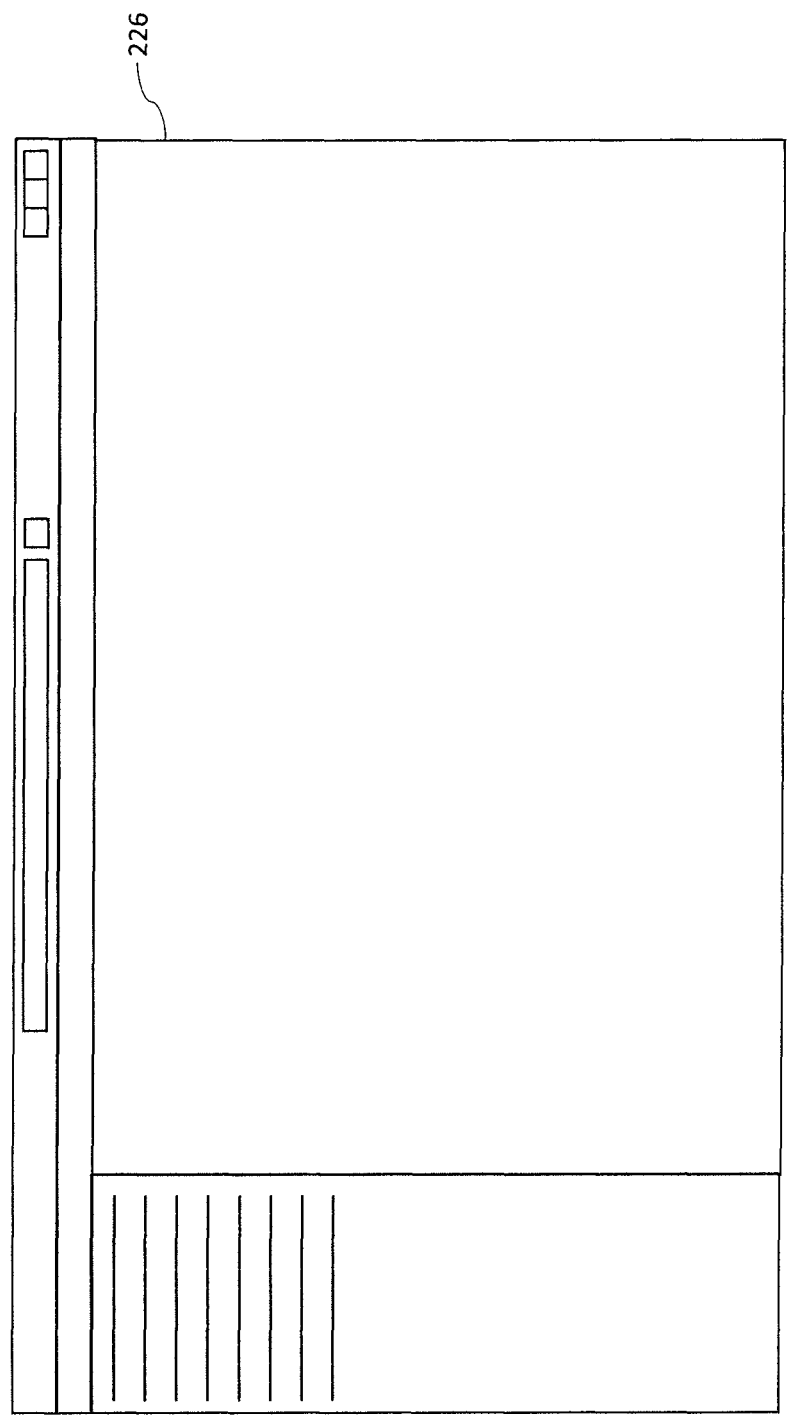
Figure 12:
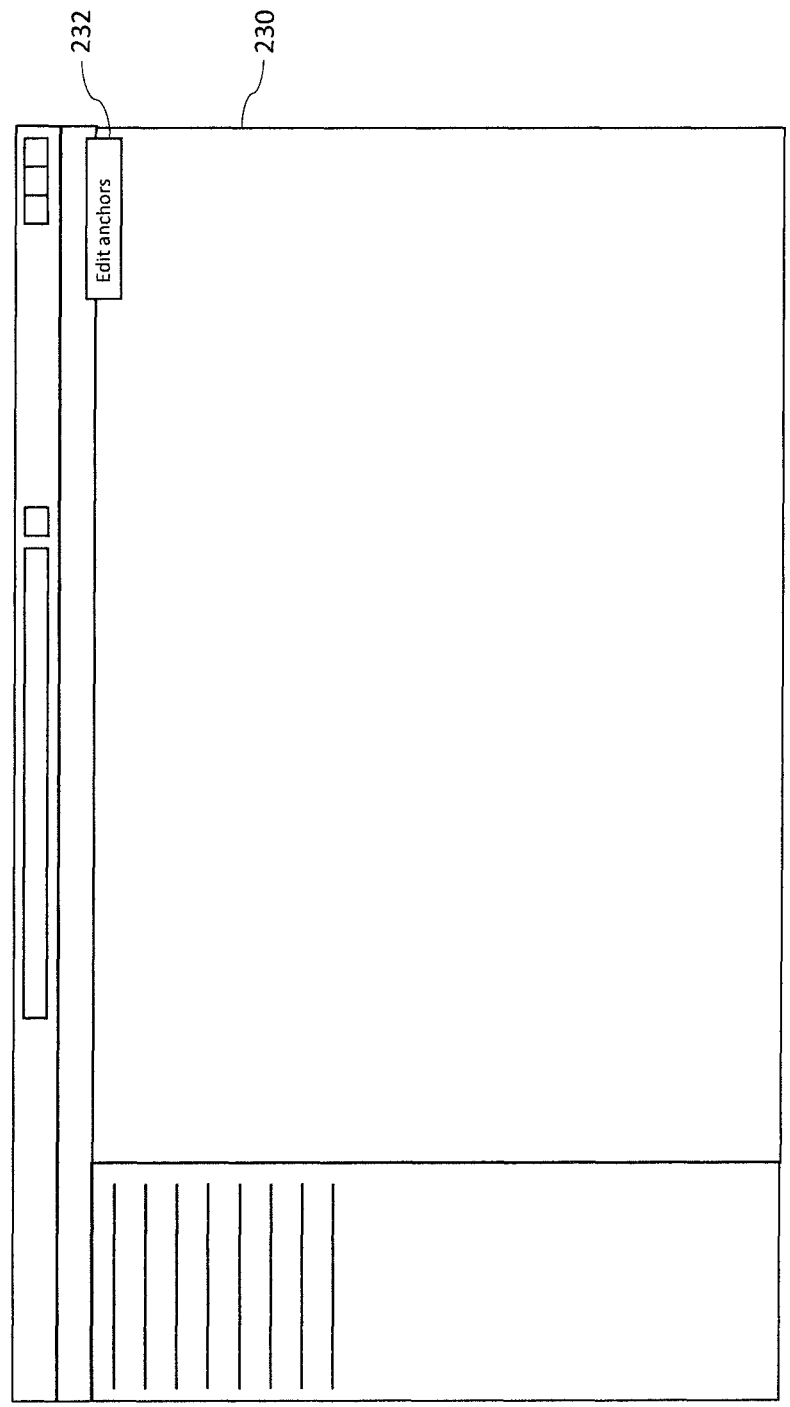

The end user accesses the web application 32 as illustrated by screen shot 226 in FIG. 11. Screen shot 226 corresponds to an initial web page 36 within the web application 32. The end user is then able to select edit anchors in menu item 232 as illustrated by screen shot 230 in FIG. 12.

Figure 13:
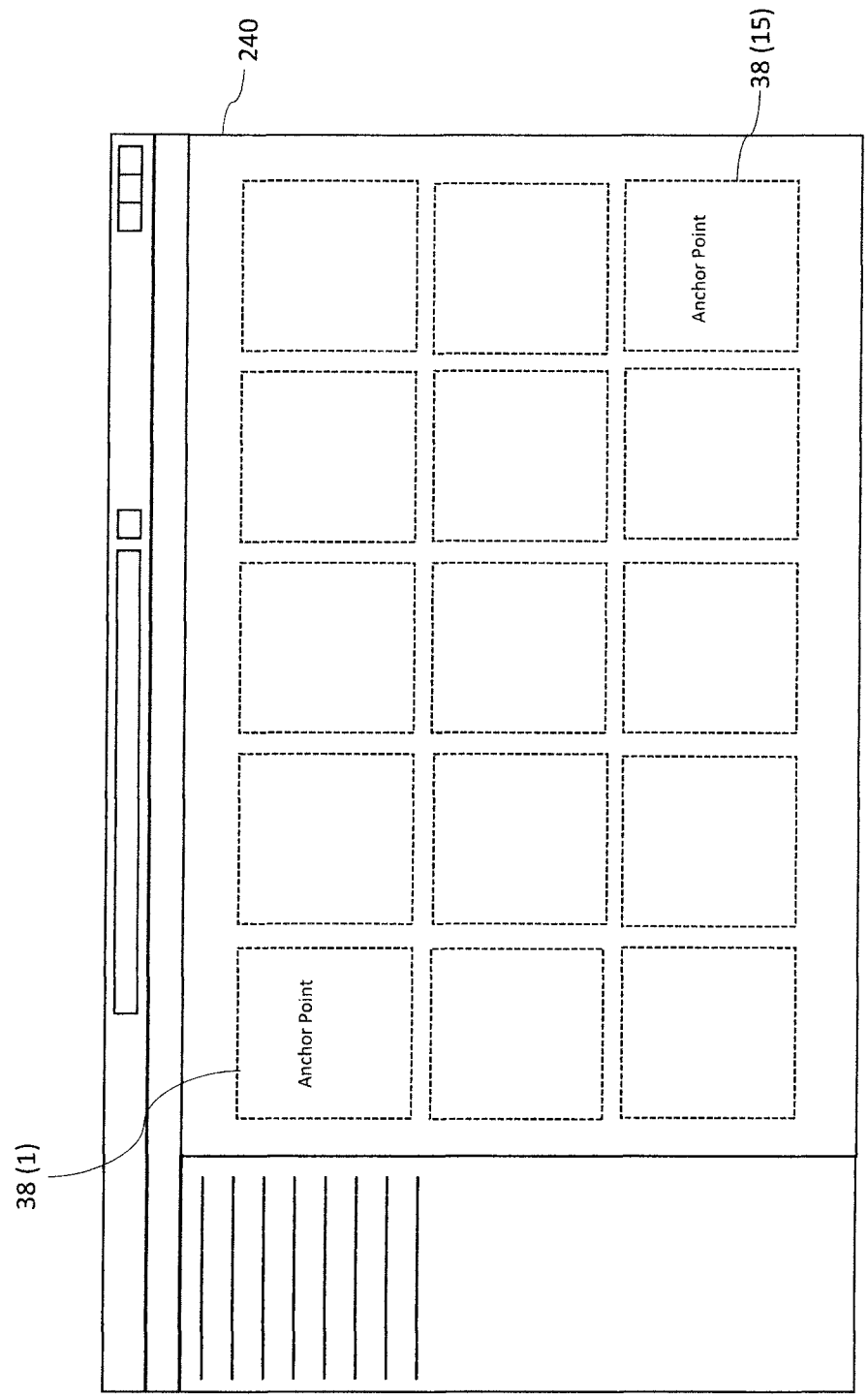
Figure 14:
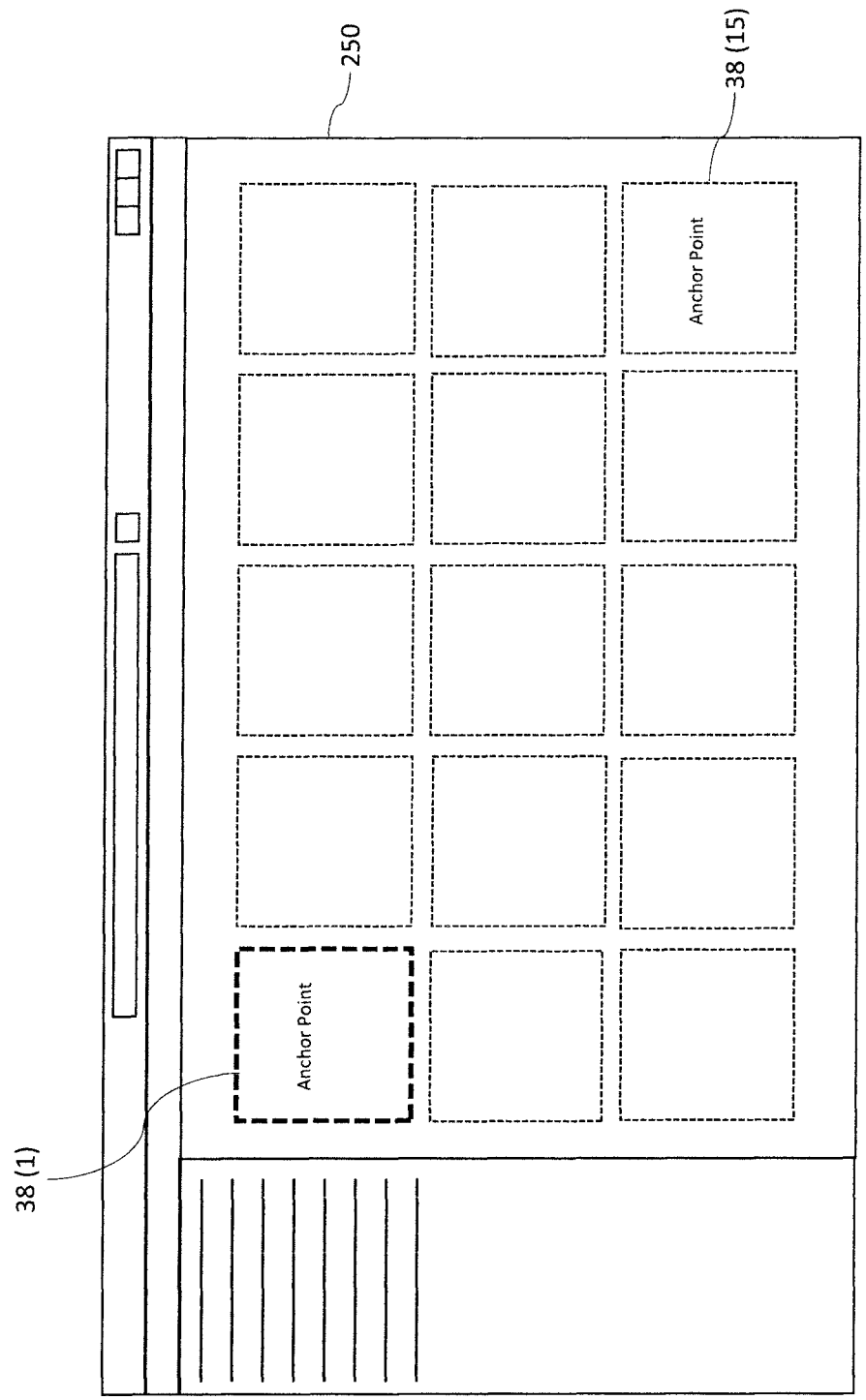
Figure 15:
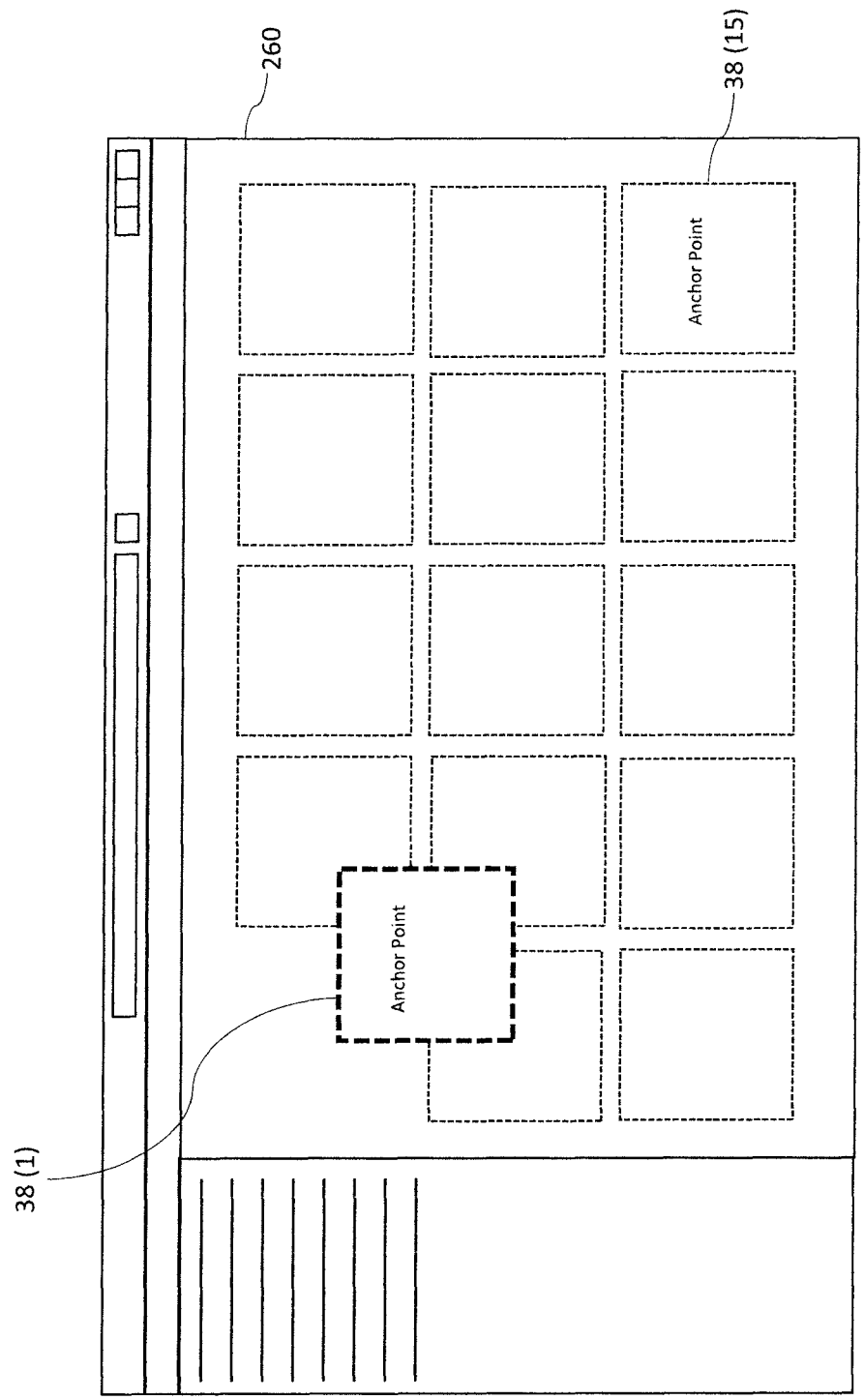

After selection of the edit anchors in menu item 232, the available anchor points 38(1)-38(15) for the web page 36 are shown as illustrated by screen shot 240 in FIG. 13. The end user then selects one of the anchor points 38(1) as illustrated by screen shot 250 in FIG. 14. The anchor point 38(1) is highlighted when selected.

The end user has a number of customization options available, as based on the defined anchor definition layer 34 corresponding to the displayed web page 36. One of the customization options is to move the selected anchor point 38(1) to a different position, such as to where anchor point 38(15) is located, as illustrated by screen shot 260 in FIG. 15. This means that the selected anchor point 38(1) has been marked by the administrator as a source, and anchor point 38(15) has been marked as a target. Anchor points 38(1) and 38(15) exchange positions.

Figure 16:
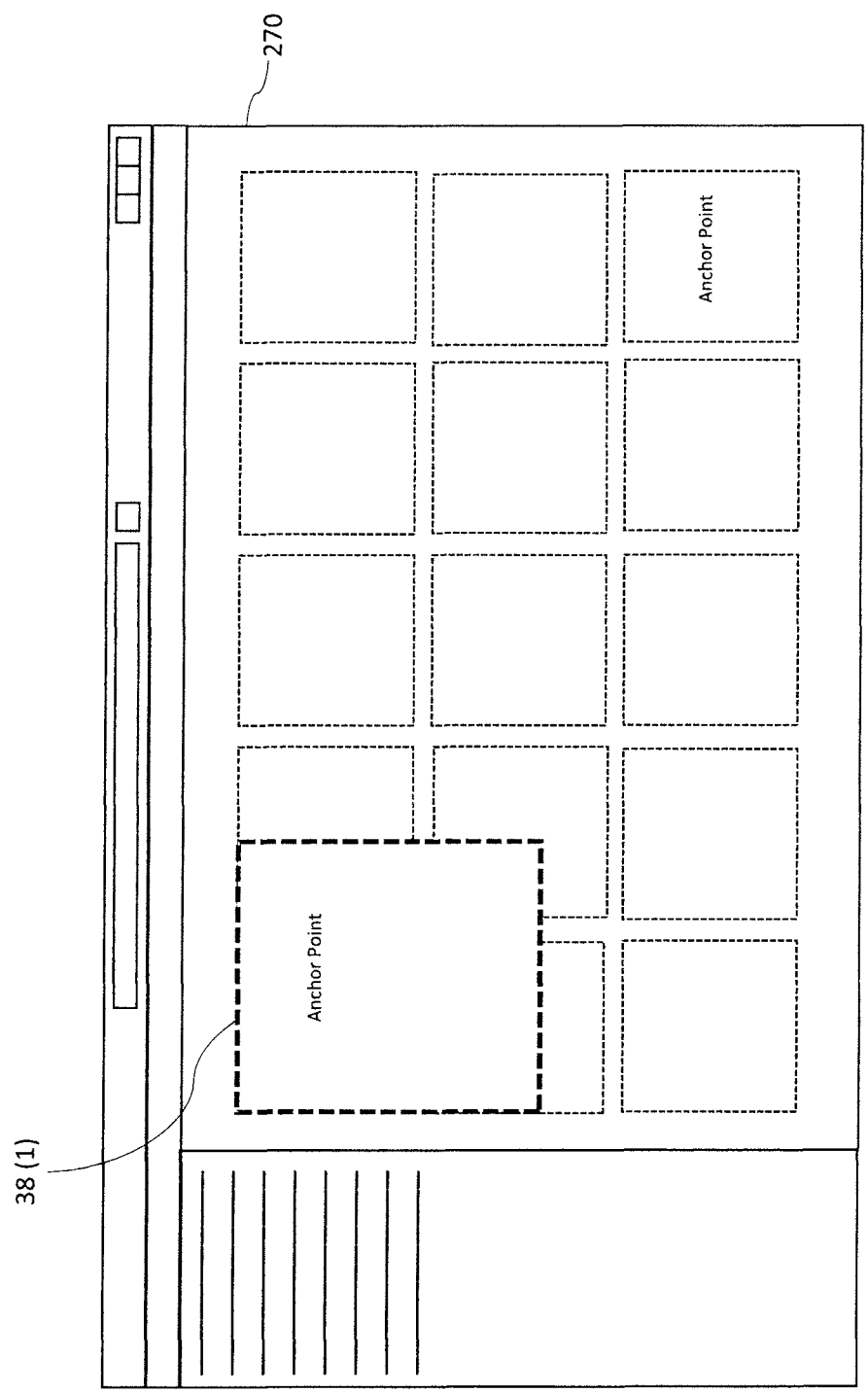
Figure 17:
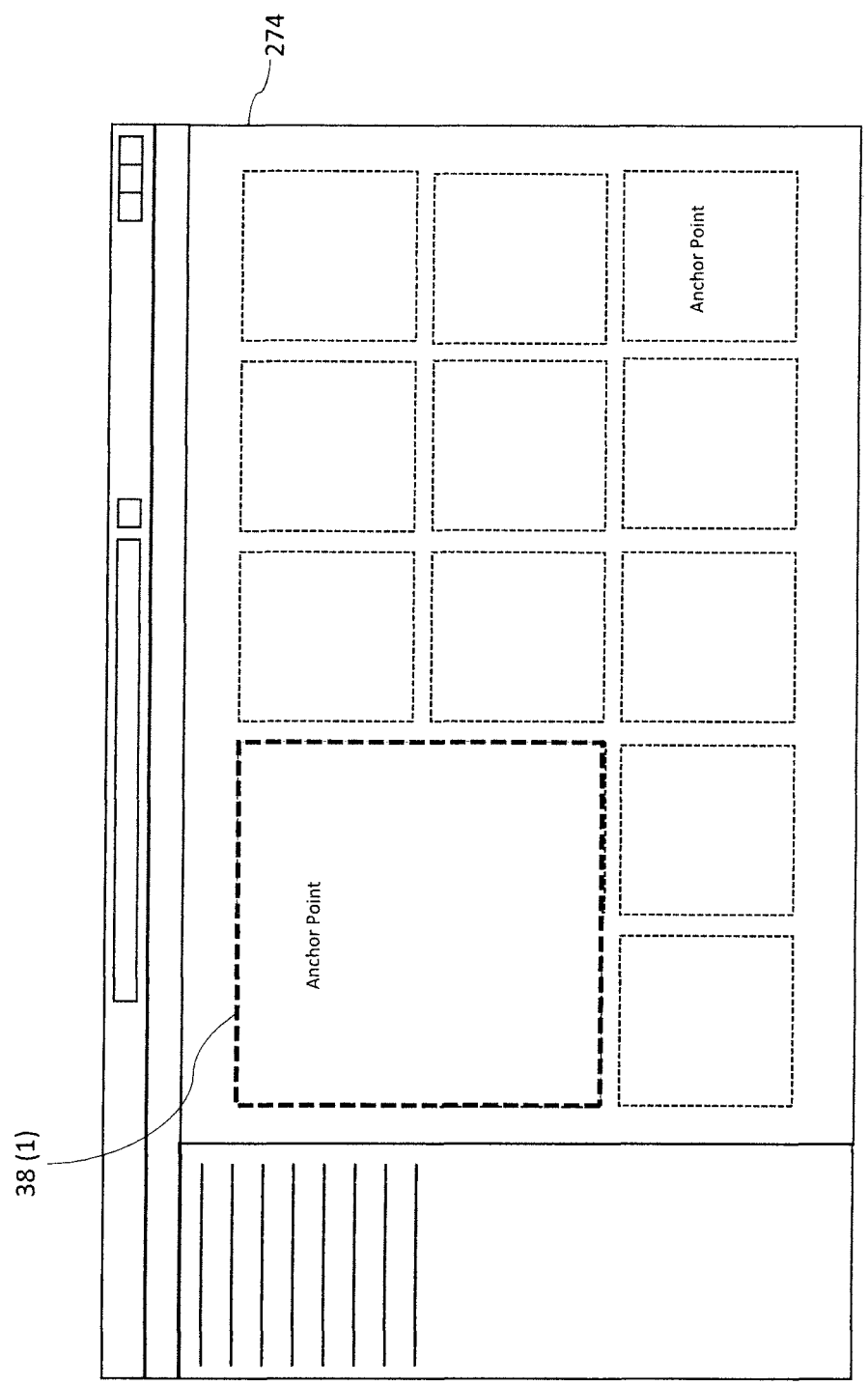

Another customization option is to resize the selected anchor point 38(1) as illustrated by screen shot 270 in FIG. 16. The end user clicks and drags the corner of the selected anchor point 38(1) until it is at the desired size, as illustrated by screen shot 274 in FIG. 17.

Figure 18:
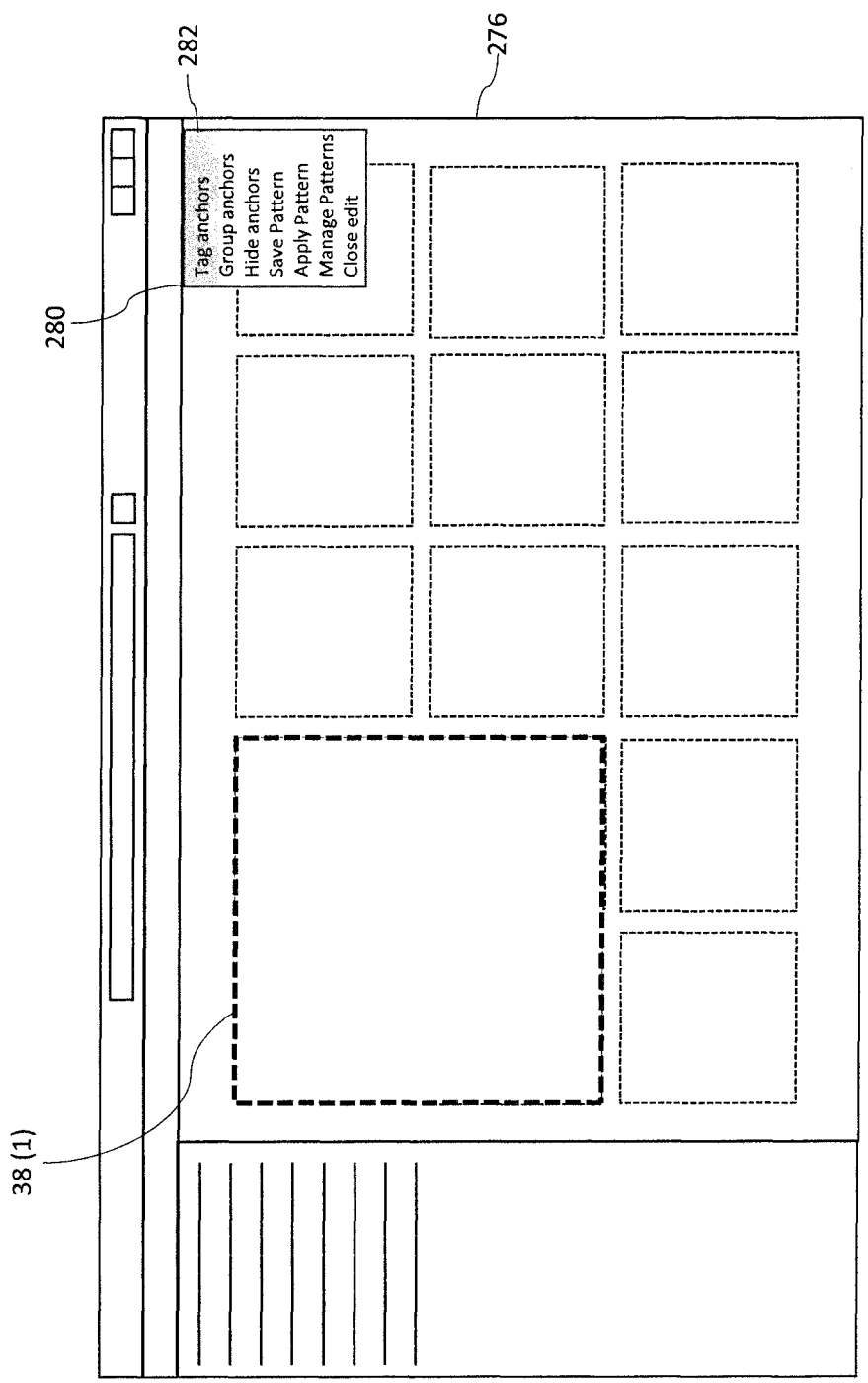
Figure 19:
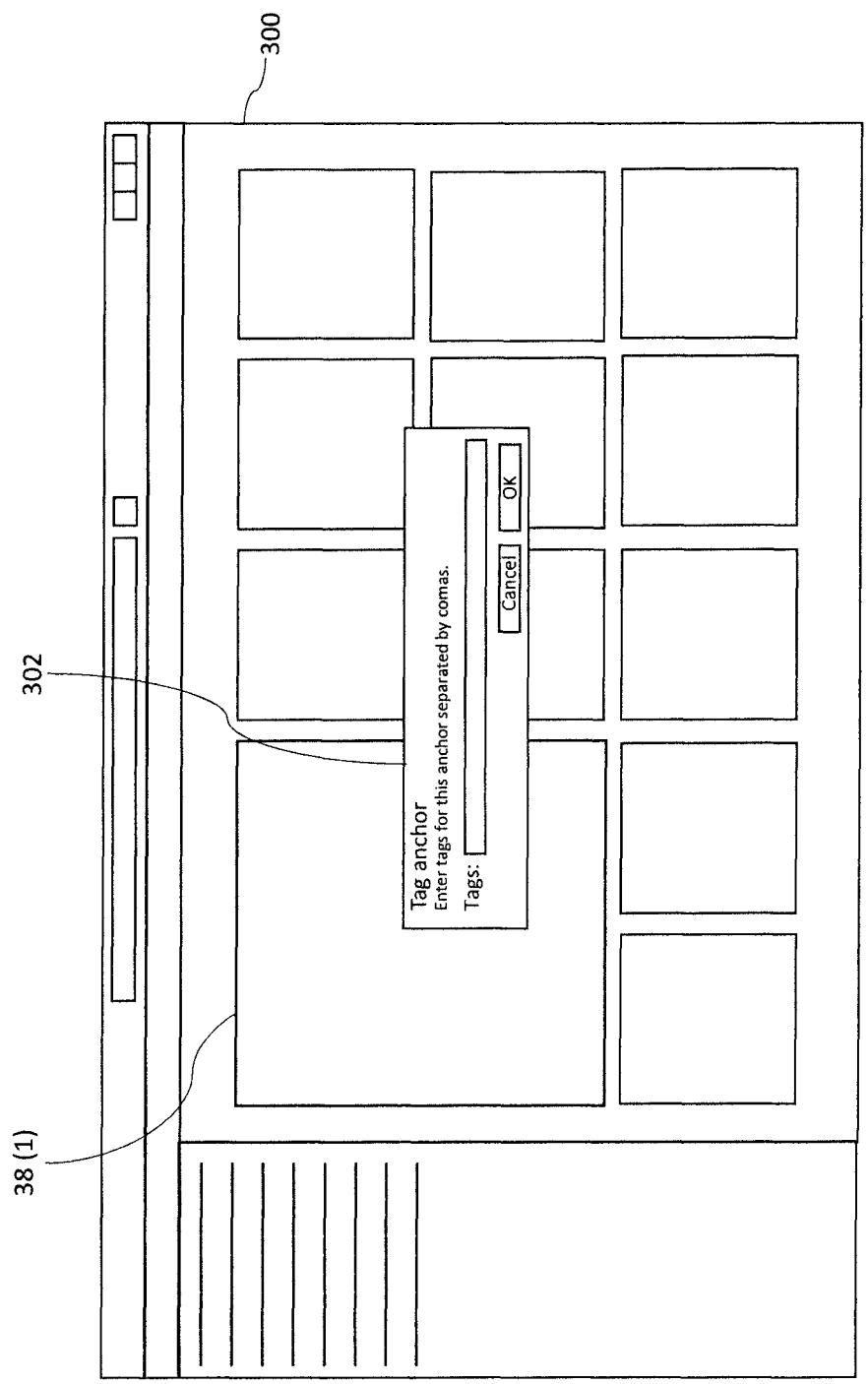
Figure 20:
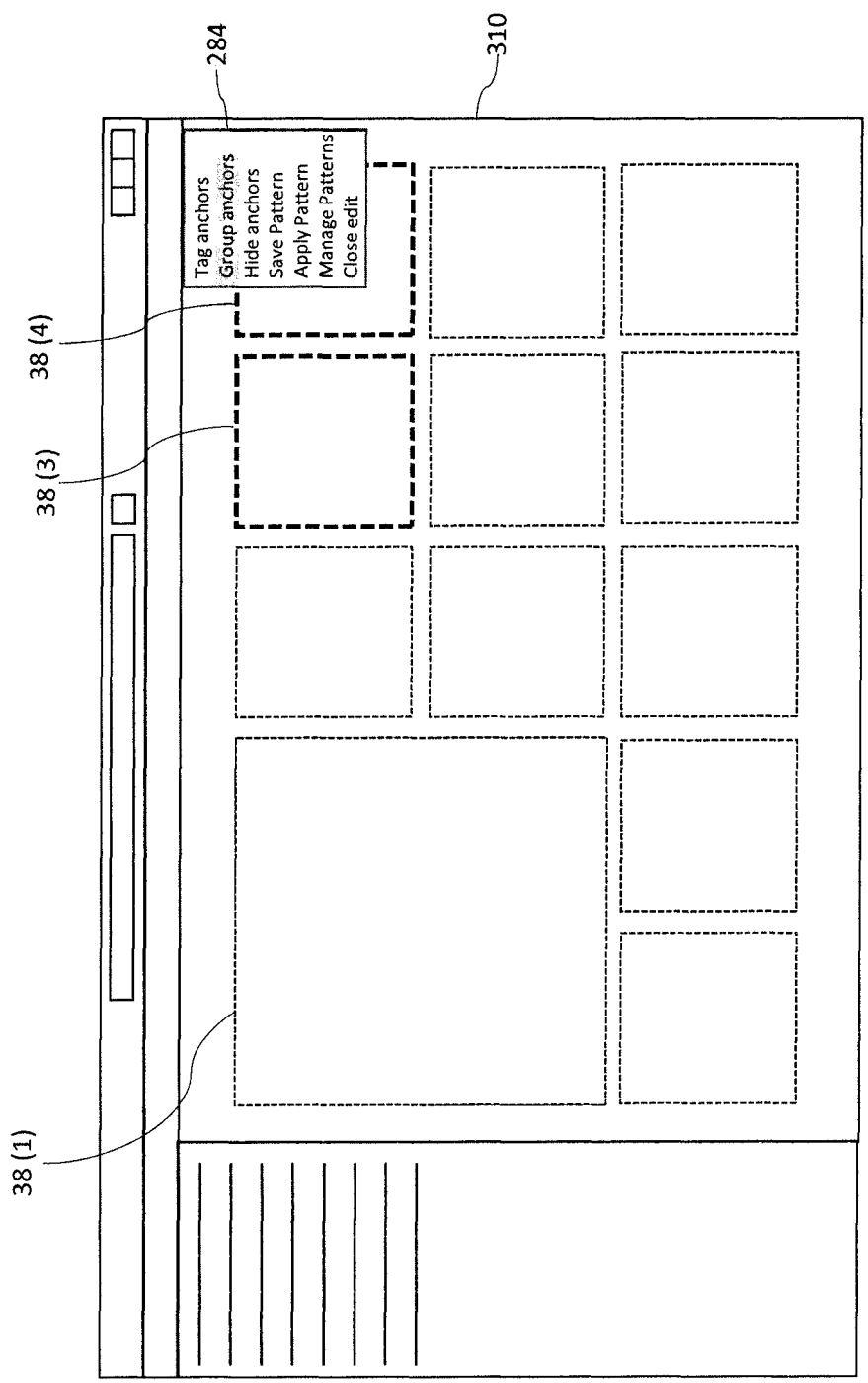
Figure 21:
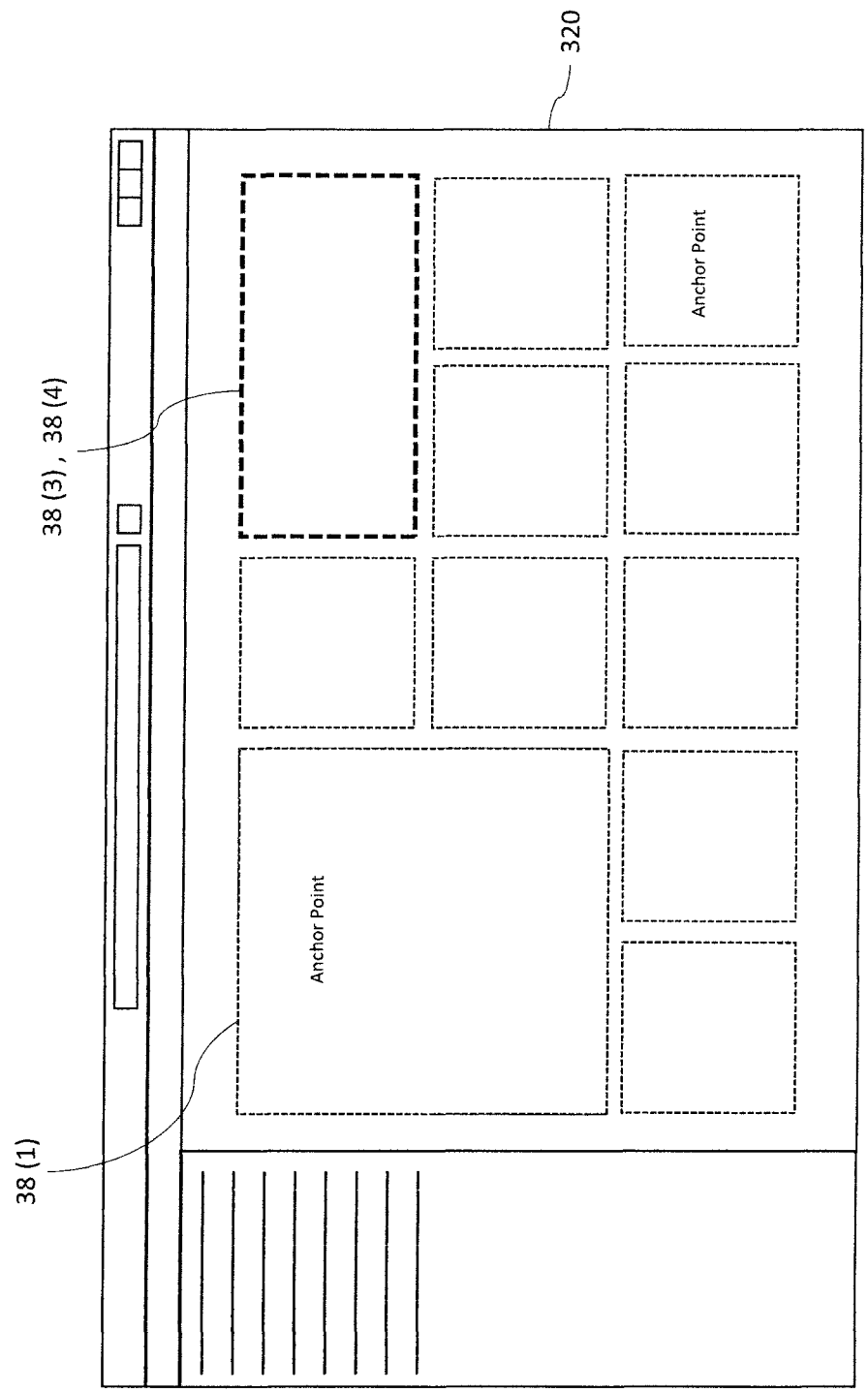
Figure 22:
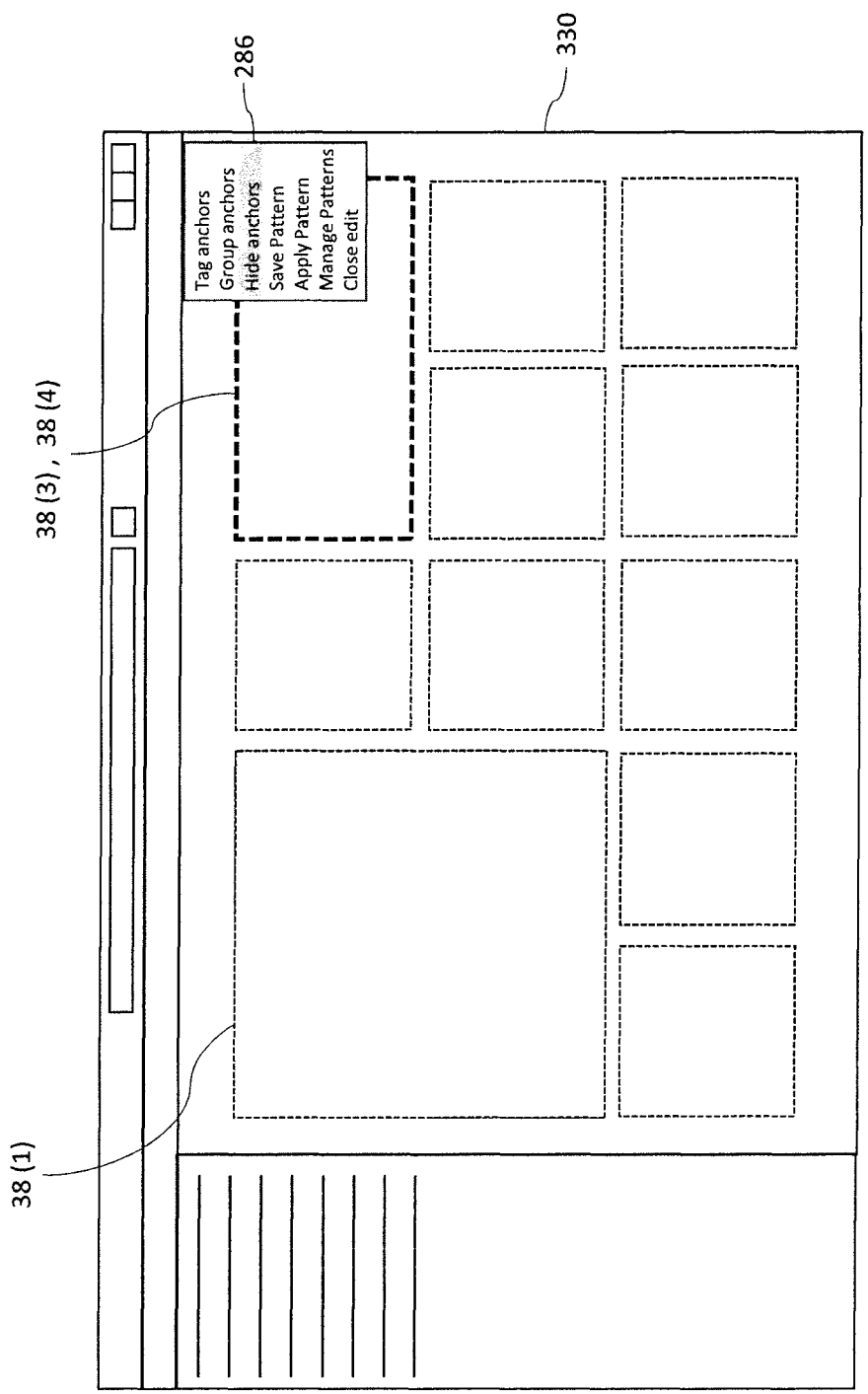
Figure 23:
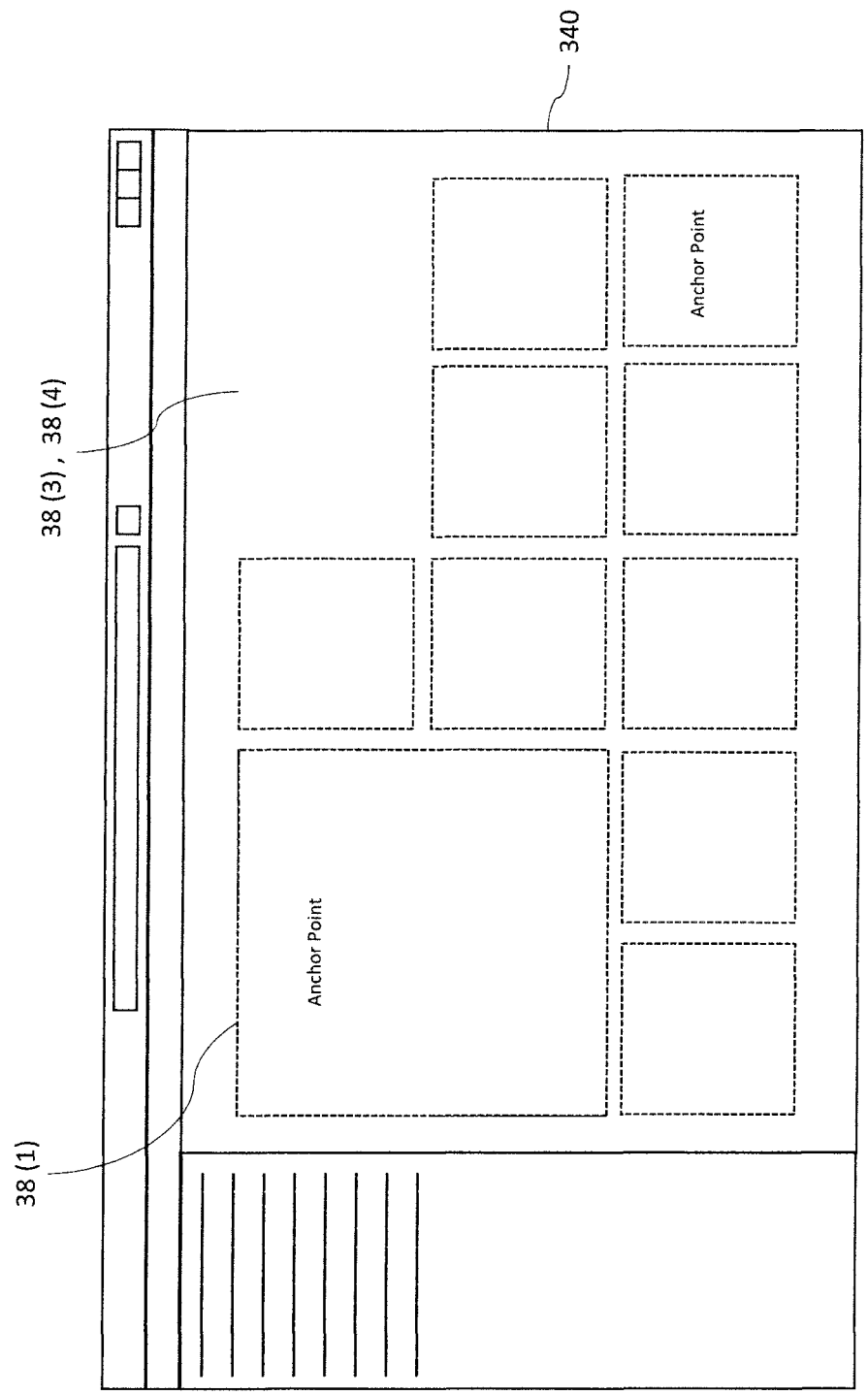
Figure 24:
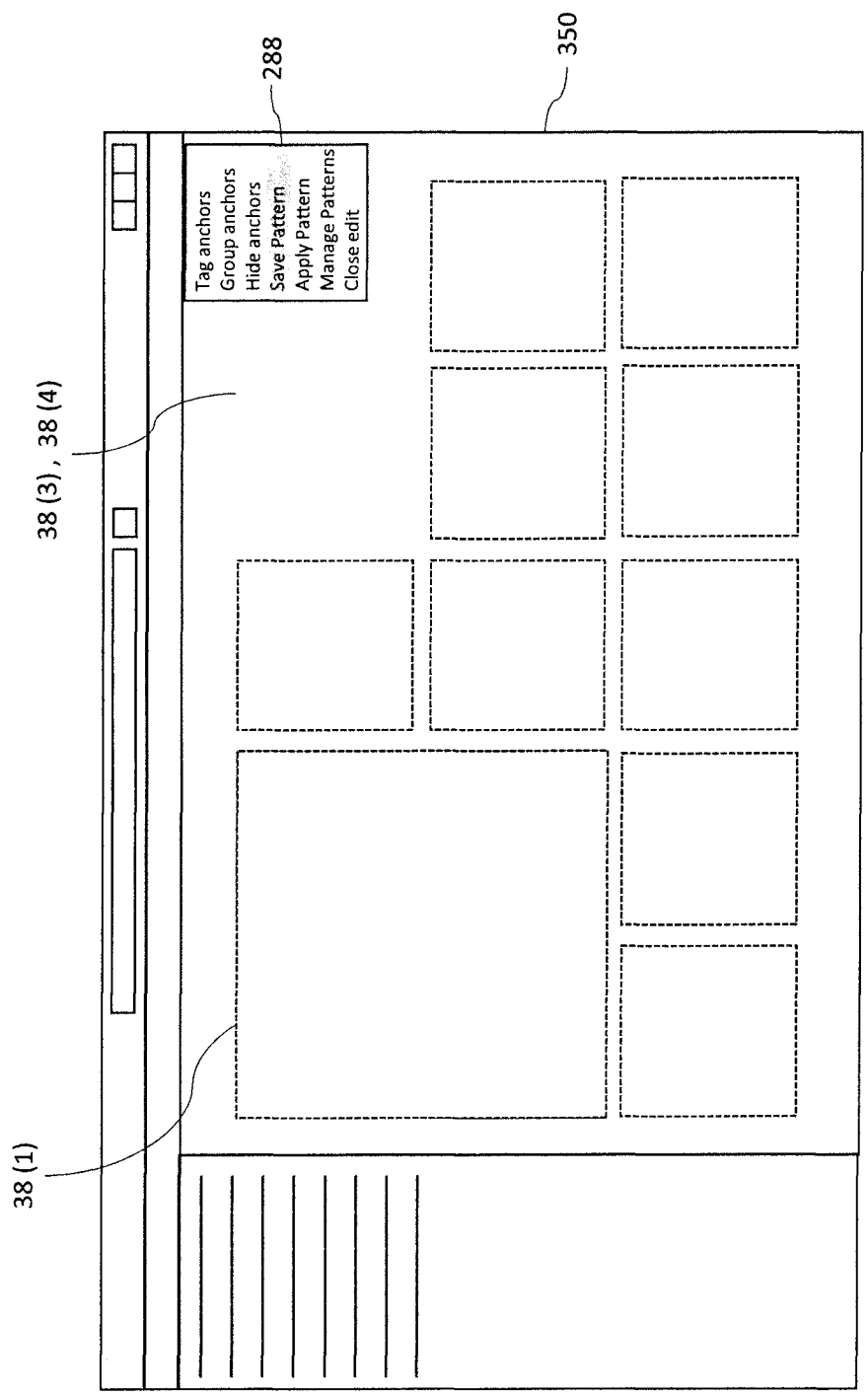
Figure 25:
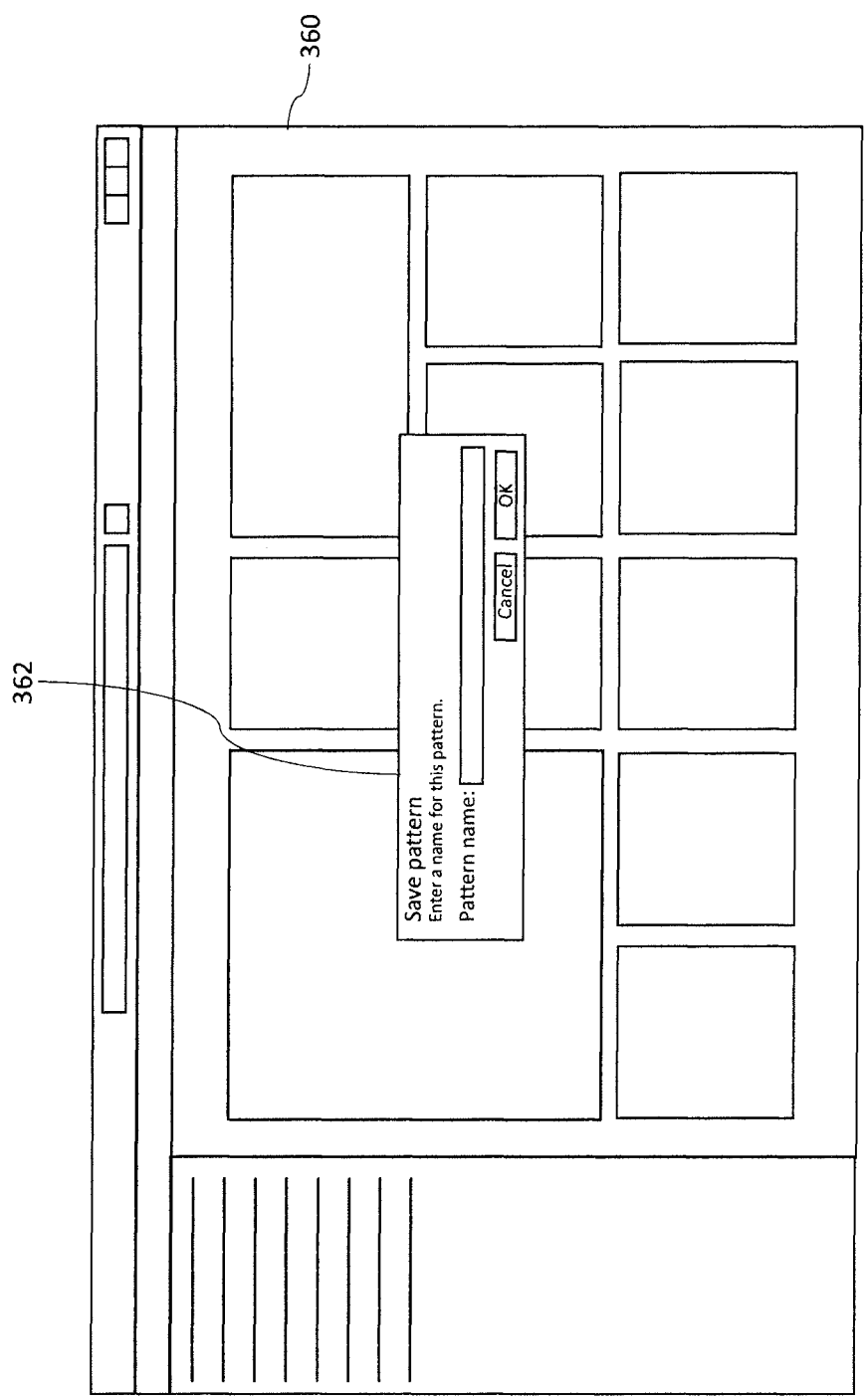
Figure 26:
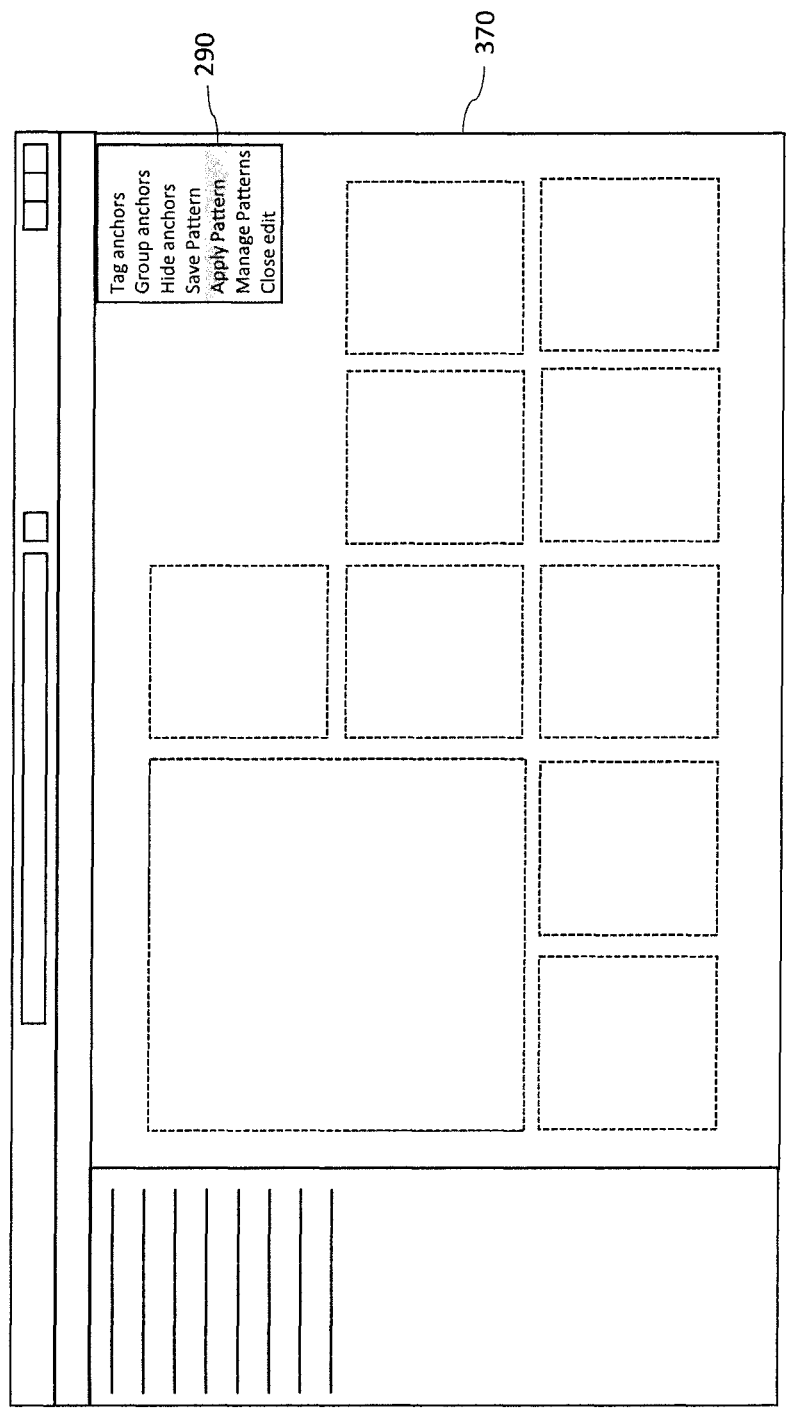
Figure 27:
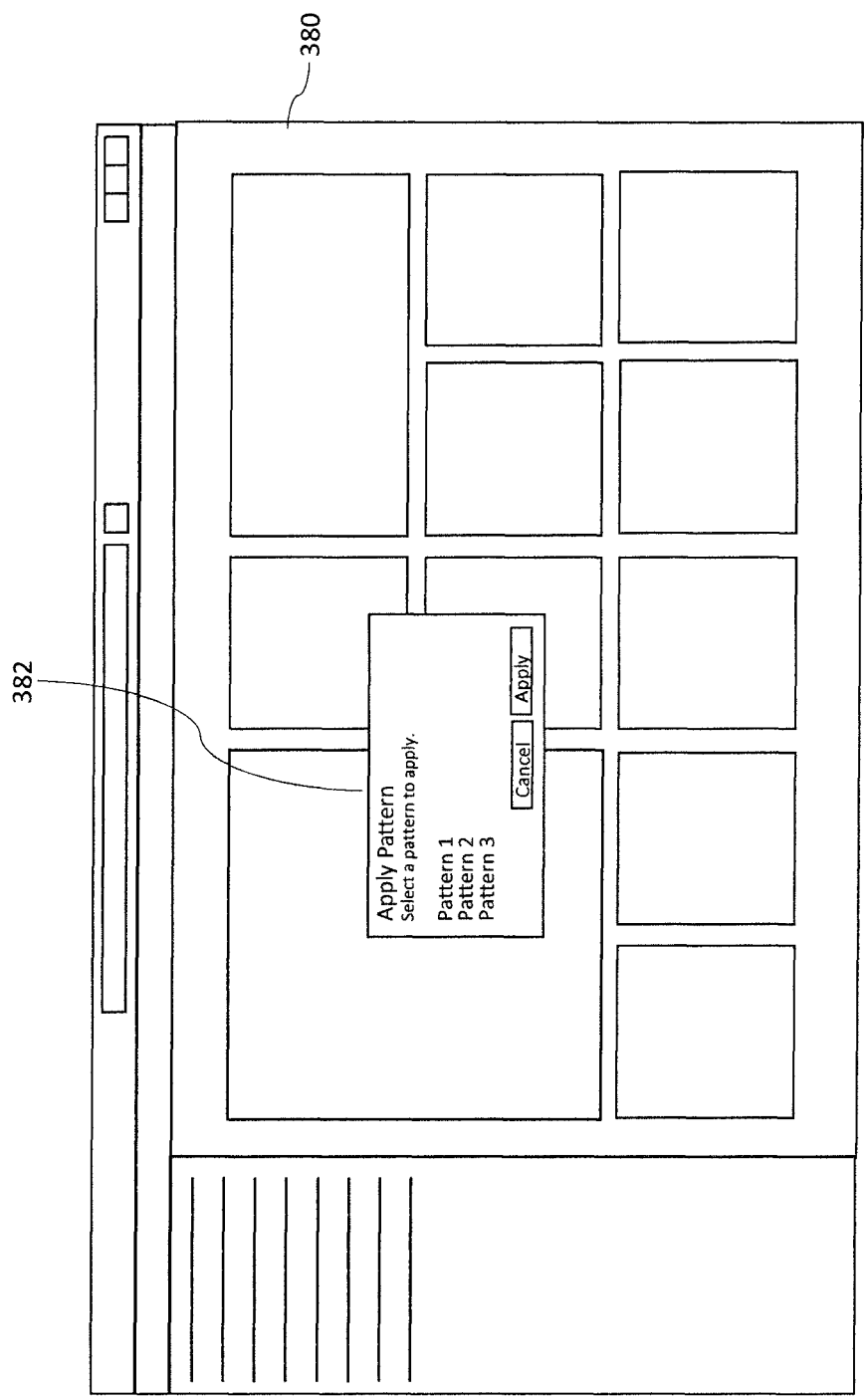

Referring now to screen shot 276 in FIG. 18, menu item 280 is dropped down by the end user. Menu item 280 provides a number of options. One of the options is for the end user to tag the selected anchor point 38(1) that has been resized. The end user selects the tag anchors menu item 282, which causes a tag anchor field 302 to be displayed as illustrated by screen shot 300 in FIG. 19. The end user is able to name the customization corresponding to the selected anchor point 38(1). A pattern may include one or more tags and one or more customizations, as will be explained below.

Another one of the options is to group anchor points together. Anchor points 38(3), 38(4) have both been selected as illustrated by screen shot 310 in FIG. 20. One option with the resize of anchor point 38(1) is to re-shuffle all the anchor points (38(1)-38(15)). Another option with the resize of anchor point 38(1) is to covering the three underlying anchor points. In the illustrated example, the latter option is applied. The end user selects the group anchors menu item 284, which causes anchor points 38(3), 38(4) to be grouped together as illustrated by screen shot 320 in FIG. 21. Grouped anchor points 38(3), 38(4) appear as a single anchor point since they are linked together.

Another one of the options is to hide anchor points. Grouped anchor points 38(3), 38(4), for example, may be hidden from view. This is accomplished by the end user selecting the hide anchors menu item 286 as illustrated by screen shot 330 in FIG. 22. As a result, the grouped anchor points 38(3), 38(4) are hidden from view as illustrated by screen shot 340 in FIG. 23. The hidden grouped anchor points 38(3), 38(4) may also be tagged as was done for the resized anchor point 38(1).

Customization changes performed by the end user may be automatically saved into an anchor customization layer 68. In this case, the user does not have to click save. Another one of the options is to select save pattern which corresponds to changes made to the anchor points 38(1)-38(15) in the displayed web page 36. The pattern is saved by name so it can be reused elsewhere. This is accomplished by the end user selecting the save pattern menu item 288 as illustrated by screen shot 350 in FIG. 24. This causes a save pattern field 362 to be displayed as illustrated by screen shot 360 in FIG. 25. The end user is able to name the saved pattern. The saved pattern may be named pattern 3, for example.

Another one of the options is to apply an existing pattern to a newly selected web page 36 where customizations may or may not have been applied yet. The customizations corresponding to a saved pattern may be applied to the newly selected web page 36 by the end user selecting the apply pattern menu item 290 as illustrated by screen shot 370 in FIG. 26. As a result, menu item 382 is displayed as illustrated by screen shot 380 in FIG. 27. The menu item 382 provides the saved patterns for the end user to select from. In this example, if pattern 3 is selected, then the changes made to the newly selected web page 36 will be the same as that in pattern 3.

Saved patterns may also be applied to web pages in different web applications. When the tags in the web pages in the different web applications match with the tags in the selected saved pattern, then the changes can be made by applying the selected saved pattern. After the end user closes edit of the anchor points, then a normal web page is displayed, as illustrated by screen shot 390 in FIG. 28. Tags are a useful tool. However, in some applications, patterns may be applied by analyzing additional meta-data associated with anchor points 38, not necessarily explicit user or admin-set tags.

Now the end user may apply the anchor customization layers 68 for normal use of the web application 32 so as to display customized web pages for the end user. The web application 32 remains the same and is not changed or modified. The rendering of the different web pages 36 that are part of the web application 32 go through the anchor customization layers 68 as defined by the end user.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A computing system comprising:
   a server comprising a web application; and
   at least one client computing device operated by at least one user and comprising:
      a display; and
      a native application comprising an embedded browser for accessing the web application in order to customize user interfaces (UI) of the web application without re-designing the web application itself, with the embedded browser to perform the following:
         access the web application in an edit mode to perform the following:
            display a web page of a plurality of web pages,
            process a DOM (document object model) structure of the displayed web page to identify anchor points that are part of the user interfaces (UI) of the web application, with the anchor points being identified as user interface enclosures on the DOM structure,
            based on user input, determine which anchor points on the displayed web page are available for customization, and
            for the anchor points that are available for customization, based on user input select one or more customization options that can be applied to each anchor point, with the anchor points and corresponding customization options defining an anchor definition layer that is associated with the displayed web page;
         after the edit mode, access the web application in a customization mode to perform the following:
            display the web page having the anchor definition layer associated therewith, including display of the anchor points that are available for customization,
            based on user input select one of the anchor points, customize the selected anchor point to change order or position of the selected anchor point based on the one or more customization options that can be applied as defined in the anchor definition layer associated with the displayed web page, with the one or more customization options being applied via user input, and
            save the customization of the selected anchor point in an anchor customization layer, with the anchor customization layer being associated with the displayed web page; and
         after exiting the customization mode, access the web application in a normal mode to perform the following:
            before display of the web page, apply the anchor customization layer associated therewith to customize display of the anchor points in the web page in response to the web page being displayed.

2. The computing system according to claim 1 further comprising an enterprise server, wherein said at least one second client computing device is enrolled with said enterprise server, and wherein the anchor definition layers are stored on said enterprise server as part of published resource metadata for the web application.

3. The computing system according to claim 1 wherein the customization options for the user include marking selected anchor points that are to be hidden from the end user, and marking selected anchor points that are to be made available to the end user for customization.

4. The computing system according to claim 3 wherein the customization options for each selected anchor point available for customization comprise at least one of the following:
   marking the anchor point as being hideable;
   marking the anchor point as being resizable;
   marking the anchor point as a source meaning that the anchor point can be moved by the end user from its current position to another position on the web page;
   marking the anchor point as a target meaning that the anchor point can accept positioning of a source anchor point which in turn causes the target anchor point to be positioned where the source anchor point was initially positioned; and
   marking the anchor point as a tile meaning that the anchor point would appear as a live tile for the web application when published in a store view by the end user.

5. The computing system according to claim 1 wherein the anchor definition layers are stored on said server as part of published resource metadata for the web application.

6. The computing system according to claim 1 wherein the customization options for the end user for each anchor point that can be customized comprise at least one of the following:
   hiding the anchor point;
   resizing the anchor point;
   re-positioning the anchor point; and
   grouping the anchor point with other anchor points.

7. The computing system according to claim 1 wherein the anchor customization layer is stored on said client computing device.

8. The computing system according to claim 7 further comprising an enterprise server, wherein said client computing device is enrolled with said enterprise server, and wherein the anchor customization layer is cached on said enterprise server.

9. The computing system according to claim 1 wherein the customization mode further permits a customized anchor point to be tagged with a label, with the tag and the customizations being saved as a pattern that can be applied to a different web page for customization by the end user based on the different web page having an anchor point tagged with the same label, with the customization of the different web page corresponding to the customizations associated with the tagged anchor point.

10. A method for operating a computing system comprising:
   a server comprising a web application;
   and a client computing device comprising:
   an embedded browser for accessing the web application in order to customize user interfaces (UI) of the web application without re-designing the web application itself, and comprising:
      accessing the web application in an edit mode to perform the following:
         display a web page of a plurality of web pages,
         process a DOM (document object model) structure of the displayed web page to identify anchor points that are part of the user interfaces (UI) of the web application, with the anchor points being identified as user interface enclosures on the DOM structure,
         based on user input, determine which anchor points on the displayed web page are available for customization, and
         for the anchor points that are available for customization, based on user input select one or more customization options that can be applied to each anchor point, with the anchor points and corresponding customization options defining an anchor definition layer that is associated with the displayed web page;
      after the edit mode, access the web application in a customization mode to perform the following:
         display the web page having the anchor definition layer associated therewith, including display of the anchor points that are available for customization,
         based on user input select one of the anchor points,
         customize the selected anchor point to change order or position of the selected anchor point based on the one or more customization options that can be applied as defined in the anchor definition layer associated with the displayed web page, with the one or more customization options being applied via user input, and
         save the customization of the selected anchor point in an anchor customization layer, with the anchor customization layer being associated with the displayed web page; and
      after exiting the customization mode, access the web application in a normal mode to perform the following:
         before display of the web page, apply the anchor customization layer associated therewith to customize display of the anchor points in the web page in response to the web page being displayed.

11. The method according to claim 10 wherein the computing system further comprises an enterprise server, wherein the second client computing device is enrolled with the enterprise server, and wherein the anchor definition layers are stored on the enterprise server as part of published resource metadata for the web application.

12. The method according to claim 10 wherein the customization options for the user include marking selected anchor points that are to be hidden from the end user, and marking selected anchor points that are to be made available to the end user for customization.

13. The method according to claim 12 wherein the customization options for each selected anchor point available for customization comprise at least one of the following:
   marking the anchor point as being hideable;
   marking the anchor point as being resizable;
   marking the anchor point as a source meaning that the anchor point can be moved by the end user from its current position to another position on the web page;
   marking the anchor point as a target meaning that the anchor point can accept positioning of a source anchor point which in turn causes the target anchor point to be positioned where the source anchor point was initially positioned; and
   marking the anchor point as a tile meaning that the anchor point would appear as a live tile for the web application when published in a store view by the end user.

14. The method according to claim 10 further comprising storing the anchor definition layers on the server as part of published resource metadata for the web application.

15. The method according to claim 10 wherein the customization options for the end user for each anchor point that can be customized comprise at least one of the following:
   hiding the anchor point;
   resizing the anchor point;
   re-positioning the anchor point; and
   grouping the anchor point with other anchor points.

16. The method according to claim 10 further comprising storing the anchor customization layer on the client computing device.

17. The method according to claim 16 wherein the computing system further comprises an enterprise server, wherein the client computing device is enrolled with the enterprise server, and further comprising caching the anchor customization layer on the enterprise server.

18. A non-transitory computer readable medium for operating a client computing device comprising a native application comprising an embedded browser for accessing a web application in order to customize user interfaces (UI) of the web application without re-designing the web application itself, with the non-transitory computer readable medium having a plurality of computer executable instructions for causing the computing device to perform steps comprising:
   access the web application in an edit mode to perform the following:
   access the web application in an edit mode to perform the following:
      display a web page of a plurality of web pages,
      process a DOM (document object model) structure of the displayed web page to identify anchor points that are part of the user interfaces (UI) of the web application, with the anchor points being identified as user interface enclosures on the DOM structure,
      based on user input, determine which anchor points on the displayed web page are available for customization, and
      for the anchor points that are available for customization, based on user input select one or more customization options that can be applied to each anchor point, with the anchor points and corresponding customization options defining an anchor definition layer that is associated with the displayed web page;
   after the edit mode, access the web application in a customization mode to perform the following:

display the web page having the anchor definition layer associated therewith, including display of the anchor points that are available for customization, based on user input select one of the anchor points, customize the selected anchor point to change order or position of the selected anchor point based on the one or more customization options that can be applied as defined in the anchor definition layer associated with the displayed web page, with the one or more customization options being applied via user input, and save the customization of the selected anchor point in an anchor customization layer, with the anchor customization layer being associated with the displayed web page; and after exiting the customization mode, access the web application in a normal mode to perform the following:

before display of the web page, apply the anchor customization layer associated therewith to customize display of the anchor points in the web page in response to the web page being displayed.

\* \* \* \* \*